US012578729B2

(12) United States Patent
Wang et al.

(10) Patent No.: US 12,578,729 B2
(45) Date of Patent: Mar. 17, 2026

(54) METHOD FOR BUILDING CONTROLLER FOR ROBOT, METHOD, DEVICE FOR CONTROLLING MOTION OF ROBOT, AND ROBOT

(71) Applicant: TENCENT TECHNOLOGY (SHENZHEN) COMPANY LIMITED, Shenzhen (CN)

(72) Inventors: Shuai Wang, Shenzhen (CN); Jingfan Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 255 days.

(21) Appl. No.: 18/456,267

(22) Filed: Aug. 25, 2023

(65) Prior Publication Data

US 2023/0409035 A1    Dec. 21, 2023

Related U.S. Application Data

(63) Continuation of application No. PCT/CN2022/133757, filed on Nov. 23, 2022.

(30) Foreign Application Priority Data

Mar. 1, 2022    (CN) .......................... 202210193884.1

(51) Int. Cl.
*G05D 1/00*          (2006.01)
(52) U.S. Cl.
CPC ......... *G05D 1/0221* (2013.01); *G05D 1/0214* (2013.01); *G05D 1/0891* (2013.01)

(58) Field of Classification Search
CPC ... G05D 1/0221; G05D 1/0214; G05D 1/0891
See application file for complete search history.

(56) References Cited

U.S. PATENT DOCUMENTS

| | | | |
|---|---|---|---|
| 6,874,591 B2 * | 4/2005 | Morrell .................. | B62K 17/00 324/426 |
| 9,568,915 B1 * | 2/2017 | Berntorp ............. | G05D 1/0214 |

(Continued)

FOREIGN PATENT DOCUMENTS

| | | |
|---|---|---|
| CN | 103381826 A | 11/2013 |
| CN | 105487376 A | 4/2016 |

(Continued)

OTHER PUBLICATIONS

English translation of CN-111340415-A (Year: 2020).*

(Continued)

*Primary Examiner* — Navid Z. Mehdizadeh
*Assistant Examiner* — Matthew Ho
(74) *Attorney, Agent, or Firm* — Anova Law Group, PLLC

(57) ABSTRACT

A method for configuring a controller for a wheel-legged robot includes: controlling motion of the robot, and obtaining motion state data and control data of the robot during a motion process, where diversity measures of the motion state data and the control data are higher than a predetermined threshold; calculating a linear equilibrium parameter matrix by using a data iteration method according to the motion state data and the control data; and configuring a controller corresponding to dynamic characteristics of the robot based on the linear equilibrium parameter matrix.

19 Claims, 10 Drawing Sheets

(56) References Cited

U.S. PATENT DOCUMENTS

| 2010/0250001 | A1 | | 9/2010 | Hodgins et al. | |
|---|---|---|---|---|---|
| 2020/0276704 | A1 | | 9/2020 | Sindhwani et al. | |
| 2020/0285209 | A1 | | 9/2020 | Chakrabarty et al. | |
| 2020/0306998 | A1 | * | 10/2020 | Talebi | B25J 9/1638 |
| 2021/0003973 | A1 | | 1/2021 | Chakrabarty et al. | |
| 2021/0053220 | A1 | * | 2/2021 | Ames | B25J 9/1664 |
| 2021/0107150 | A1 | * | 4/2021 | Whitman | G05B 13/042 |
| 2021/0237265 | A1 | * | 8/2021 | Zhu | B25J 9/1602 |
| 2023/0087057 | A1 | | 3/2023 | Wang et al. | |
| 2023/0125422 | A1 | * | 4/2023 | Tsuzaki | B62D 57/032 700/246 |

FOREIGN PATENT DOCUMENTS

| CN | 110799308 | A | | 2/2020 | |
|---|---|---|---|---|---|
| CN | 111340415 | A | * | 6/2020 | G06F 16/215 |
| CN | 112632803 | A | | 4/2021 | |
| CN | 112775976 | A | | 5/2021 | |
| CN | 112947430 | A | | 6/2021 | |
| CN | 113498523 | A | | 10/2021 | |
| CN | 113752250 | A | | 12/2021 | |
| CN | 113753150 | A | | 12/2021 | |

OTHER PUBLICATIONS

The State Intellectual Property Office of the People's Republic of China (SIPO) Office Action 1 for 202210193884.1 Jun. 6, 2024 10 Pages (including translation).

Lijia Ding, "Research on Balance Control and Gait Planning of Biped Robot", MS thesis. University of Electronic Science and Technology of China, Issue 02, Feb. 15, 2018 (Feb. 15, 2018).

Yan Xu et al., "Posture Coupled Optimization Control of Wheel-legged Robot." China Mechanical Engineering 27.04 (2016): 427.

The World Intellectual Property Organization (WIPO) International Search Report for PCT/CN2022/133757 Feb. 20, 2023 13 Pages (including translation).

HandleTM. [Online]. Available: www.bostondynamics.com/handle.

X. Li, S. Zhang, H. Zhou, H. Feng, and Y. Fu, "Locomotion adaption for hydraulic humanoid wheel-legged robots over rough terrains," International Journal of Humanoid Robotics, p. 2150001, 2021.

H. Zhou, H. Yu, X. Li, H. Feng, S. Zhang, and Y. Fu, "Configurationtransformation of the wheel-legged robot using inverse dynamics control," in Proceedings of 2021 IEEE International Conference on Robotics and Automation (ICRA). IEEE, 2021.

V. Klemm, A. Morra, C. Salzmann, F. Tschopp, K. Bodie, L. Gulich, N. Kung, D. Mannhart, C. Pfister, M. Vierneisel, F. Weber, R. Deuber, and R. Siegwart, "Ascento: A two-wheeled jumping robot," in Proceedings of 2019 International Conference on Robotics and Automation (ICRA), 2019, pp. 7515-7521.

H. Chen, B. Wang, Z. Hong, C. Shen, P. M. Wensing, and . Zhang, "Underactuated motion planning and control for jumping with wheeled-bipedal robots," IEEE Robotics and Automation Letters, 2020.

S. Wang, L. Cui, J. Zhang, J. Lai, D. Zhang, K. Chen, Y. Zheng, Z. Zhang, and Z. P. Jiang, "Balance control of a novel wheellegged robot: Design and experiment," in Proceedings of The 2021 International Conference on Robotics and Automation (ICRA). IEEE, 2021.

O. Khatib, L. Sentis, J. Park, and J. Warren, "Whole-body dynamic behavior and control of human-like robots," International Journal of Humanoid Robotics, vol. 1, No. 01, pp. 29-43, 2004.

A. Escande, N. Mansard, and P.-B. Wieber, "Hierarchical quadratic programming: Fast online humanoid-robot motion generation," The International Journal of Robotics Research, vol. 33, No. 7, pp. 1006-1028, 2014.

G. Zambella, G. Lentini, M. Garabini, G. Grioli, M. G. Catalano, A. Palleschi, L. Pallottino, A. Bicchi, A. Settimi, and D. Caporale, "Dynamic whole-body control of unstable wheeled humanoid robots," IEEE Robotics and Automation Letters, vol. 4, No. 4, pp. 3489-3496, 2019.

S. Xin and S. Vijayakumar, "Online dynamic motion planning and control for wheeled biped robots," in 2020 IEEE/RSJ International Conference on Intelligent Robots and Systems (IROS). IEEE, 2020, pp. 3892-3899.

C. D. Bellicoso, F. Jenelten, p. Fankhauser, C. Gehring, J. Hwangbo, and M. Hutter, "Dynamic locomotion and whole-body control for quadrupedal robots," in Proceedings of 2017 IEEE/RSJ International Conference on Intelligent Robots and Systems (IROS). IEEE, 2017, pp. 3359-3365.

V. Klemm, A. Morra, L. Gulich, D. Mannhart, D. Rohr, M. Kamel, Y. de Viragh, and R. Siegwart, "LQR-assisted whole-body control of a wheeled bipedal robot with kinematic loops," IEEE Robotics and Automation Letters, vol. 5, No. 2, pp. 3745-3752, 2020.

K. H. Khalil, Nonlinear systems, 3rd ed. Upper Saddle River, NJ: Prentice Hall, 2002.

J. Huang, Z.-H. Guan, T. Matsuno, T. Fukuda, and K. Sekiyama, "Sliding-mode velocity control of mobile-wheeled inverted-pendulum systems," IEEE Transactions on Robotics, vol. 26, No. 4, pp. 750-758,2010.

L. Cui, S. Wang, J. Lai, X. Chen, S. Yang, Z. Zhang, and Z. P. Jiang, "Nonlinear balance control of an unmanned bicycle: Design and experiments," in Proceedings of 2020 IEEE/RSJ International Conference on Intelligent Robots and Systems (IROS). IEEE, 2020, pp. 7279-7284.

S. Wang, L. Cui, J. Lai, S. Yang, X. Chen, Y. Zheng, Z. Zhang, and Z. P. Jiang, "Gain scheduled controller design for balancing an autonomous bicycle," in Proceedings of 2020 IEEE/RSJ International Conference on Intelligent Robots and Systems (IROS). IEEE, 2020, pp. 7595-7600.

L. Cui, S. Wang, Z. Zhang, and Z. P. Jiang, "Asymptotic trajectory tracking of autonomous bicycles via backstepping and optimal control," IEEE Control Systems Letters, vol. 6, pp. 1292-1297, 2021.

K. J. A strom and B. Wittenmark, Adaptive control. Courier Corporation, 2013.

Y. Jiang and Z. P. Jiang, Robust Adaptive Dynamic Programming. NJ, USA: Wiley-IEEE Press, 2017.

Y. Zhou, J. Lin, S. Wang, and C. Zhang, "Learning ball-balancing robot through deep reinforcement learning," in Proceedings of 2021 International Conference on Computer, Control and Robotics (ICCCR). IEEE, 2021, pp. 1-8.

C. Yang, K. Yuan, Q. Zhu, W. Yu, and Z. Li, "Multi-expert learning of adaptive legged locomotion," Science Robotics, vol. 5, No. 49, 2020.

B. Pang, T. Bian, and Z. P. Jiang, "Robust policy iteration for continuous-time linear quadratic regulation," IEEE Transactions on Automatic Control, 2021.

T. Bian and Z. P. Jiang, "Reinforcement learning and adaptive optimal control for continuous-time nonlinear systems: A value iteration approach," IEEE Transactions on Neural Networks and Learning Systems, pp. 1-10, 2021.

"Value iteration and adaptive dynamic programming for data driven adaptive optimal control design," Automatica, vol. 71, pp. 348-360, 2016.

L. Cui, S. Wang, J. Zhang, D. Zhang, J. Lai, Y. Zheng, Z. Zhang, and Z. P. Jiang, "Learning-based balance control of wheel-legged robots," IEEE Robotics and Automation Letters and to be present at 2021 IEEE/RSJ International Conference on Intelligent Robots and Systems (IROS), 2021.

R. Featherstone and D. Orin, "Robot dynamics: equations and algorithms," in Proceedings 2000 ICRA. Millennium Conference. IEEE International Conference on Robotics and Automation. Symposia Proceedings (Cat. No. 00CH37065), vol. 1. IEEE, 2000, pp. 826-834.

D. Kleinman, "On an iterative technique for Riccati equation computations," IEEE Transactions on Automatic Control, vol. 13, No. 1, pp. 114-115, 1968.

R. Pintelon and J. Schoukens, System identification: a frequency domain approach. John Wiley & Sons, 2012.

(56) References Cited

OTHER PUBLICATIONS

V. Kucera, "A review of the matrix Riccati equation," Kybernetika,
vol. 9, No. 1, pp. 42-61, 1973.

* cited by examiner control the robot motion, and obtain the motion state data and
the control data of the robot during the motion process
/ S201 calculate the linear equilibrium parameter matrix using the
numerical iteration manner according to the motion state data
and the control data
/ S202 calculate the linear equilibrium parameter matrix using the
numerical iteration manner according to the motion state data
and the control data
/ S203

FIG. 2

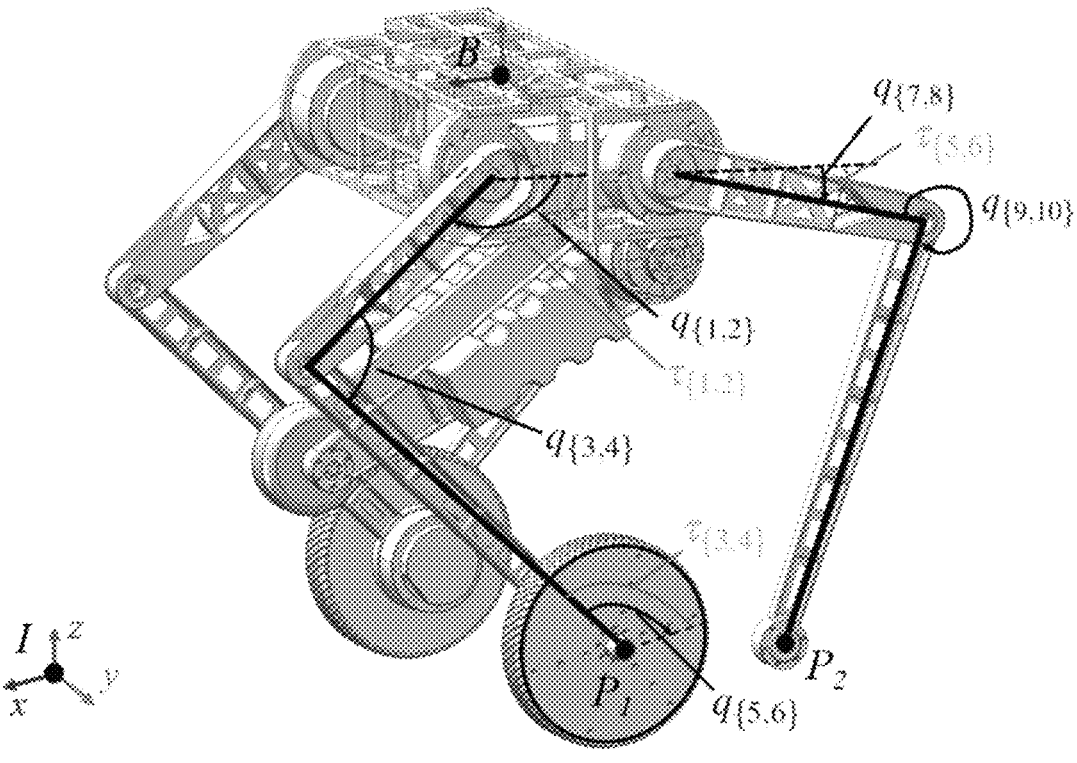

FIG. 3

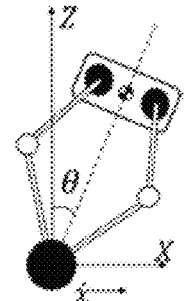
Robot losing equilibrium due to low-speed motion
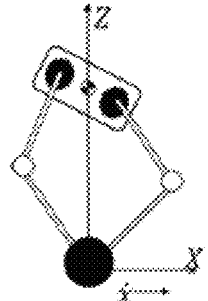
Robot losing equilibrium due to high-speed motion
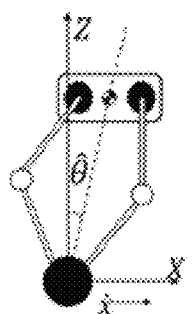
Robot maintaining an equilibrium/equilibrium-like state for a period of time
FIG. 5
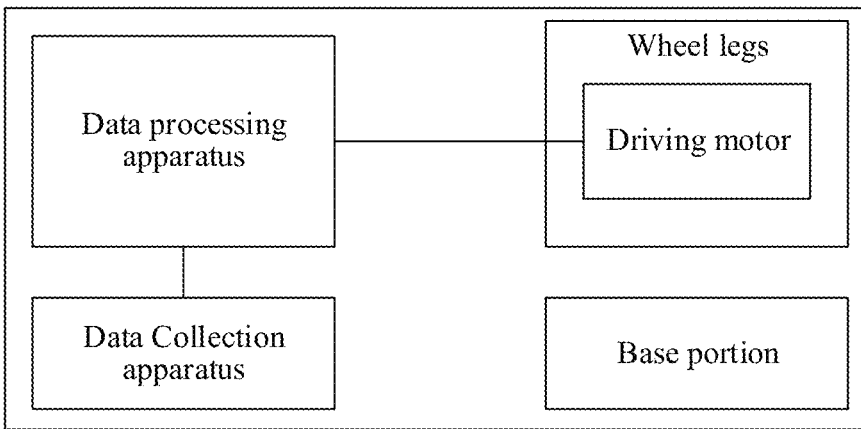
FIG. 6

State A      State B      State C      State D

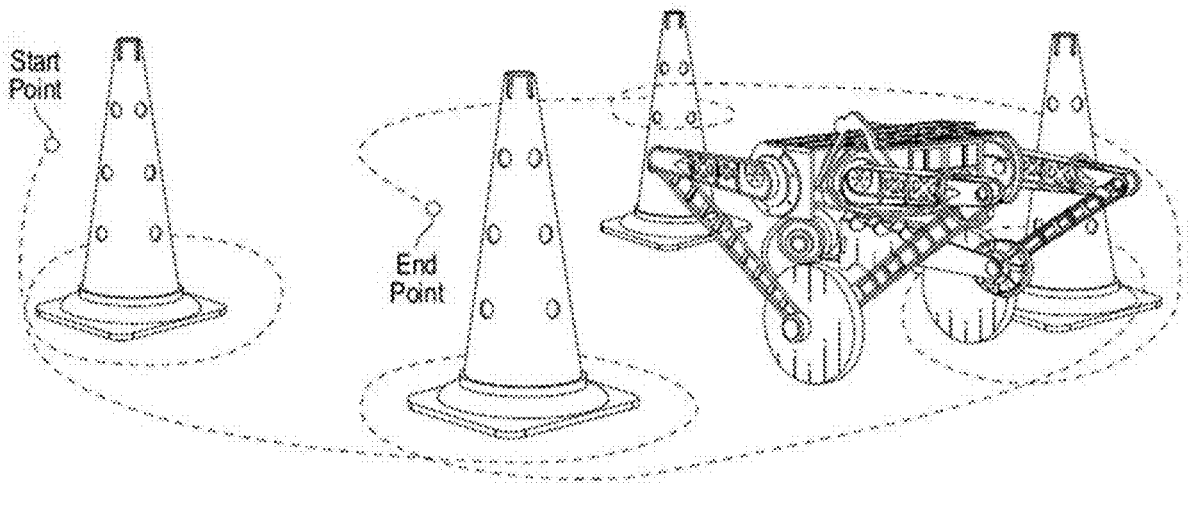
FIG. 11
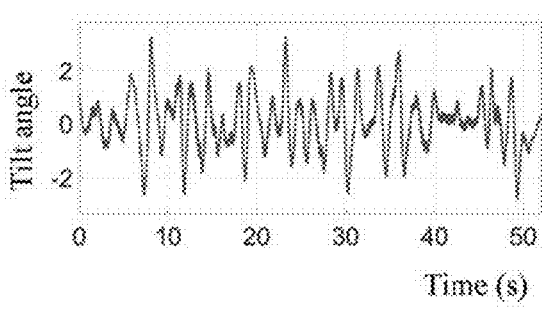
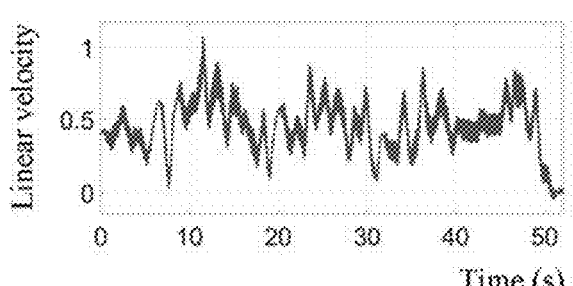
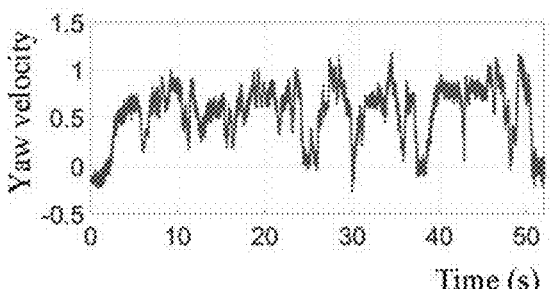
FIG. 12

METHOD FOR BUILDING CONTROLLER FOR ROBOT, METHOD, DEVICE FOR CONTROLLING MOTION OF ROBOT, AND ROBOT

CROSS-REFERENCES TO RELATED APPLICATIONS

This application is a continuation application of PCT Patent Application No. PCT/CN2022/133757, filed on Nov. 23, 2022, which claims priority to Chinese Patent Application No. 2022101938841, entitled "METHOD FOR BUILDING CONTROLLER FOR ROBOT, AND ROBOT" filed with the Chinese Patent Office on Mar. 1, 2022, the entire contents of both of which are incorporated herein by reference.

FIELD OF THE TECHNOLOGY

The present disclosure relates to the field of artificial intelligence and robots, and more particularly to a method for building a controller for a robot, a method, device for controlling motion of the robot, a robot, a computer readable storage medium, and a computer program product.

BACKGROUND OF THE DISCLOSURE

With wide application of artificial intelligence and robot technologies in civil and commercial fields, robots based on artificial intelligence and robot technologies play an increasingly important role in intelligent transportation, smart home and other fields, and also face higher requirements.

At present, when controlling motion of a robot, especially an under-actuated robot, it is usually necessary to design a dynamic model accurately corresponding to the mechanical structure of the robot, and then the control force at each joint of the robot is determined based on the change of the dynamic model during the motion process, to ensure equilibrium of the robot during the motion process. However, due to complexity of the mechanical structure of a robot, especially for some wheel-legged robots, it is difficult to obtain an accurate dynamic model even if the mechanical structure of the robot is known. Furthermore, even if the dynamic model is known, it is difficult to accurately perform parameter identification in the dynamic model in some cases. If the parameters of the dynamic model are known but not accurate, the controller effects of the robot are thus not ideal. Therefore, it is necessary to propose a scheme for flexibly controlling the robot.

SUMMARY

For the above problems, the present disclosure provides a method for building a controller for a robot, a method, device for controlling motion of the robot, a robot, a computer readable storage medium and a computer program product; and the controller for flexibly controlling the robot can be adaptively obtained, so as to improve the motion flexibility of the robot.

In an aspect, the present disclosure provides a method for building a controller for a robot, executed by a processor, the method includes: controlling motion of the robot, and obtaining motion state data and control data of the robot during a motion process, where diversity measures of the motion state data and the control data are higher than a predetermined threshold; calculating a linear equilibrium parameter matrix by using a data iteration method according to the motion state data and the control data; and configuring a controller corresponding to dynamic characteristics of the robot based on the linear equilibrium parameter matrix.

In another aspect, the present disclosure provides a method for controlling motion of a robot, executed by a processor, the robot being driven by at least one driving wheel to move, the method including: receiving a motion instruction indicating a motion trajectory of the robot; applying a driving force to the driving wheel according to the motion instruction, so that the robot moves according to the motion trajectory; obtaining motion state data and control data of the robot during a motion process, where diversity measures of the motion state data and the control data are higher than a predetermined threshold; calculating a linear equilibrium parameter matrix by using a value iteration manner based on the motion state data and the control data; and configuring a controller corresponding to dynamic characteristics of the robot based on the linear equilibrium parameter matrix; and controlling a driving force applied to the driving wheel by using the controller.

In still another aspect, the present disclosure provides a robot, including: a data collection device configured to: obtain motion state data of the robot; a data processing device configured to: obtain control data corresponding to the motion state data; calculating a linear equilibrium parameter matrix by using a value iteration manner based on the motion state data and the control data, where diversity measures of the motion state data and the control data are higher than a predetermined threshold; and configure a controller corresponding to dynamic characteristics of the robot based on the linear equilibrium parameter matrix.

In still another aspect, the present disclosure provides a device for building a controller for a robot, the device including: a motion control module configured to control motion of the robot, and obtain motion state data and control data of the robot during a motion process, wherein diversity measures of the motion state data and the control data are higher than a predetermined threshold; a data processing module configured to calculate a linear equilibrium parameter matrix by using a value iteration manner according to the motion state data and the control data; and a controller building module configured to configure a controller corresponding to dynamic characteristics of the robot based on the linear equilibrium parameter matrix.

In still another aspect, the present disclosure provides a device for controlling motion of a robot, the robot being driven by at least one driving wheel to move, the device including: an instruction receiving module configured to receive a motion instruction indicating a motion trajectory of the robot; an instruction executing module configured to apply a driving force to the driving wheel according to the motion instruction, so that the robot moves according to the motion trajectory; a data obtaining module configured to obtain motion state data and control data of the robot during a motion process, where diversity measures of the motion state data and the control data are higher than a predetermined threshold; a value iteration module configured to calculate a linear equilibrium parameter matrix by using a value iteration manner according to the motion state data and the control data; a controller building module configured to configure a controller corresponding to dynamic characteristics of the robot based on the linear equilibrium parameter matrix; and a driving force control module configured to control the driving force applied to the driving wheel by using the controller.

In still another aspect, the present disclosure provides a non-transitory computer readable storage medium storing computer readable instructions thereon, the computer readable instructions, when executed by one or more processors, performing steps of any above method.

BRIEF DESCRIPTION OF THE DRAWINGS

To describe the technical solutions in the embodiments of the present disclosure more clearly, the following briefly describes the drawings required for describing the embodiments. Apparently, the drawings in the following description show merely some embodiments of the present disclosure, and a person of ordinary skill in the art may still derive other drawings from these drawings without creative efforts. The following drawings are not intended to be drawn to scale proportionally to actual sizes, emphasis instead being placed upon illustrating the subject matter of the present disclosure.

FIG. 2 illustrates an exemplary flow diagram of a method for configuring a controller for a robot according to an embodiment of the present disclosure.

FIG. 3 illustrates a labeling schematic diagram corresponding to a robot according to an embodiment of the present disclosure.

FIG. 5 illustrates a schematic diagram of a method for building a controller for a robot according to an embodiment of the present disclosure.

FIG. 6 illustrates another structural diagram of a robot according to an embodiment of the present disclosure.

FIG. 11 illustrates a schematic experiment diagram of testing a controller of a robot according to an embodiment of the present disclosure.

FIG. 12 illustrates an experiment data diagram of testing a controller of a robot according to an embodiment of the present disclosure.

DESCRIPTION OF EMBODIMENTS

Figure 1:
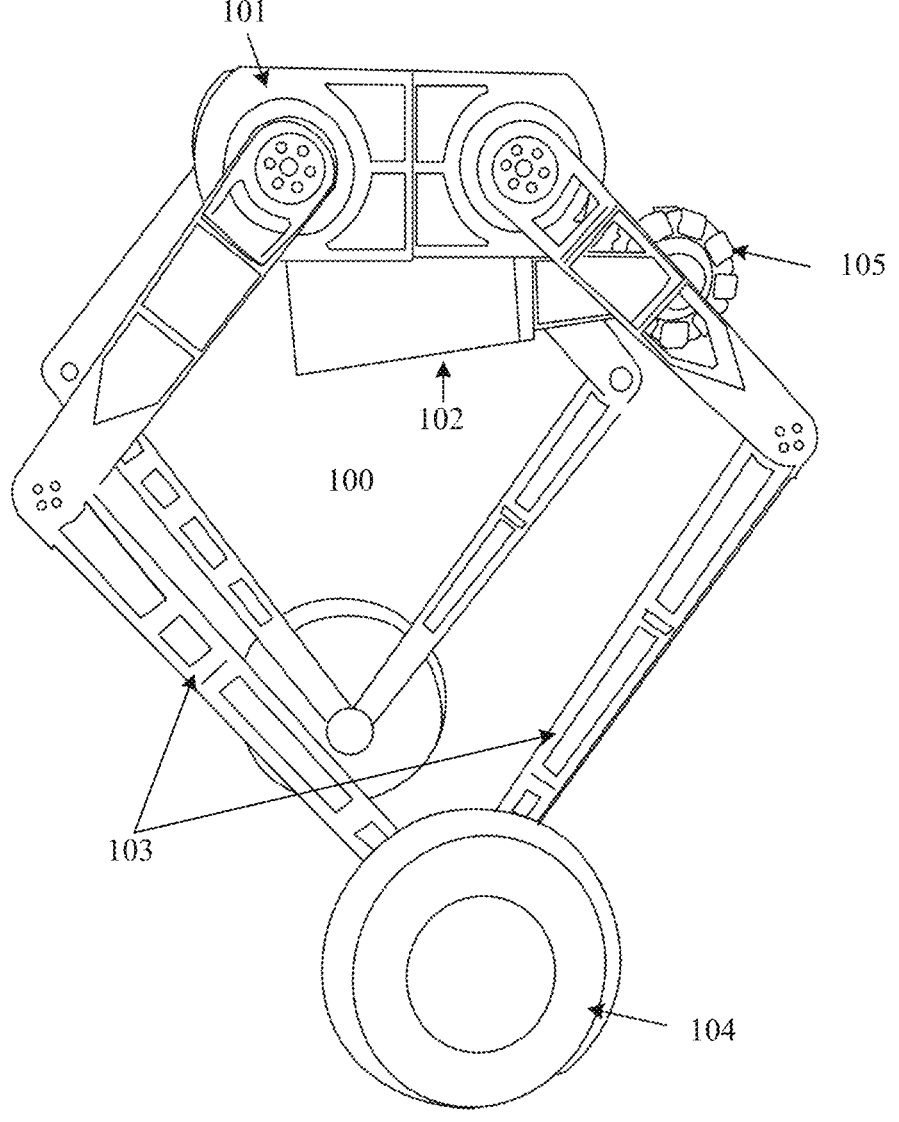
FIG. 1 illustrates a schematic structural diagram of a robot with left and right wheel legs in a single wheel-legged configuration according to an embodiment of the present disclosure.

The following will clearly and completely describe the technical solutions in the embodiments of the present disclosure with reference to the drawings. Apparently, the described embodiments are merely part rather than all of the embodiments of the present disclosure. All other embodiments obtained by a person of ordinary skill in the art based on the embodiments of the present disclosure without creative efforts also fall within the protection scope of the present disclosure.

As illustrated in the present disclosure and claims, words such as "a/an," "one," "one kind," and/or "the" do not refer specifically to singular forms and may also include plural forms, unless the context expressly indicates an exception. In general, terms "comprise" and "include" merely indicate including clearly identified steps and elements. The steps and elements do not constitute an exclusive list. A method or a device may also include other steps or elements.

Although the present disclosure makes various references to some modules in the system according to the embodiments of the present disclosure, any quantity of different modules may be used and run on a user terminal and/or a server. The modules are merely illustrative, and different aspects of the system and method may use different modules. The module may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Flow diagrams are used in the present disclosure for illustrating operations performed by systems according to embodiments of the present disclosure. It is to be understood that, the foregoing or following operations are not necessarily strictly performed according to an order. On the contrary, various steps may be performed in a reverse order or simultaneously according to needs. Meanwhile, other operations may be added to the processes, or one or more operations may be deleted from the processes.

The technical solutions of the present disclosure mainly relate to robot technologies in artificial intelligence, and mainly relate to intelligent control of robots. A robot is a kind of mechanical and electronic equipment which combines mechanical transmission and modern microelectronics technologies to imitate certain human skills, and is developed on the basis of electronics, machinery and information technologies. A robot does not have to look like a human. As long as it can autonomously complete tasks and orders given by humans, the robot is a member of the robot family. A robot is an automated machine that possesses some intelligent capabilities similar to those of a human or a living being, such as perception, planning, movement and collaboration, and possesses a high degree of flexibility. With development of the computer technology and the artificial intelligence technology, a robot is greatly improved in functional and technical levels. Technologies such as mobile robots and robot vision and tactile are typical representatives.

The present disclosure relates to an application of artificial intelligence to robot control, specifically, the present disclosure provides a method for building a controller for a robot based on artificial intelligence. The solution adds use of an arbitrary controller to be optimized to build a controller corresponding to dynamic characteristics of the robot. The robot under control of the controller corresponding to dynamic characteristics of the robot has a motion state closer to an equilibrium point relative to the robot under control of the arbitrary controller to be optimized The robot to which the present disclosure relates may be an under-actuated robot. Under-actuation is a kind of non-linear control object with the number of independent control variables less than the number of degrees of freedom. For example, the under-actuated robot may be a wheel-legged robot as illustrated in FIG. 1. Specifically, FIG. 1 illustrates a schematic structural diagram of a robot with left and right wheel legs in a single wheel-legged configuration according to an embodiment of the present disclosure.

As illustrated in FIG. 1, which illustrates a schematic structural diagram of a robot 100 in an exemplary manner. The wheel-legged robot 100 may include wheel legs 103; the wheel legs 103 include driving wheels 104 (also referring to as feet). The wheel-legged robot 100 may further include a base portion 101, the base portion 101 refers to a main body part of the robot and may be, for example, a trunk portion of the robot, and the base portion may be, for example, a planar plate-like member or a rectangular parallelepiped-shaped member that is connected to the wheel legs of the robot. As an example, one end of the wheel legs 103 is connected to the base portion 101, and the other end is connected to the driving wheels 104. The base portion 101 is equipped with a power output device (for example, a motor), which can be used for providing power to the driving wheels for driving the wheel legs 103. It is to be understood that the robot may further include a base portion connected to the wheel legs or an additional member arranged on the base portion according to actual needs. It is to be understood that merely one structure example of the robot is given above, and embodiments of the present disclosure are not limited by the specific members of the robot and connection manners thereof.

The driving wheels 104 in the wheel legs 103 may enable the wheel-legged robot 100 to perform both walking and wheel motion. In some embodiments, the wheel-legged robot 100 may further include a controllable additional member (for example, a tail) and the tail may be configured to equilibrate the wheel-legged robot and may also assist in motion of the wheel-legged robot. For example, the tail may assist the wheel-legged robot in maintaining equilibrium during motion. In some embodiments, the wheel-legged robot may further include a controllable robotic arm and the robotic arm may be used to perform operation tasks such as handling, picking, and the like. The wheel-legged robot may further include a multi-foot wheel-legged robot, such as a two-foot wheel-legged robot and a four-foot wheel-legged robot, and embodiments of the present disclosure are not limited herein.

For example, the wheel legs 103 are parallel legs (the position of the equilibrium point is between two legs of the two-foot wheel-legged robot 100). Referring to FIG. 1, the wheel legs 102 of the robot 100 include a left wheel leg and a right wheel leg. Each of the left wheel leg and the right wheel leg includes a driving wheel and two parallel legs connected to a central axis of the driving wheel and for realizing motion control of the driving wheel. For example, the left wheel leg includes a left driving wheel. A first left wheel leg and a second left wheel leg connected in parallel; the right wheel leg 112 includes, for example, a right driving wheel, a first right wheel leg and a second right wheel leg. The first right wheel leg and the second right wheel leg are connected in parallel. As illustrated in FIG. 1, the left wheel leg and the right wheel leg have a mirror symmetry structure.

For example, the number of driving wheels may be one, two, four, or other, and the motion of each driving wheel may be controlled by two legs in parallel or multiple legs in series. It is to be understood that embodiments of the present disclosure are not limited by the specific composition types of the left wheel leg and the right wheel leg and the number of driving wheels thereof. In some embodiments, both the left wheel leg and the right wheel leg are of a single wheel leg configuration. A single wheel leg configuration means that the wheel leg comprises merely a single driving wheel.

The legs of the robot can be either serial legs or parallel legs. Compared to the serial legs, the parallel legs have stronger stiffness and can withstand the impact that may be induced in complex motion. The driving wheels 104 may provide motion capability for the wheel-legged robot 100 to glide while in contact with the ground. In some embodiments, the two-foot wheel-legged robot 100 may further include an additional member 102 connected to the base portion 101. The additional member 102 may be equipped with a driven wheel 105. The additional member 102 includes one rotational degree of freedom. Motion of the additional member 102 also affects changes of the base portion 101 and the wheel legs 103, for example, the position change of the additional member may drive the base portion to enable the base portion to have a certain rotation velocity. Thus, equilibrium and posture of the robot 100 can be adjusted by adjusting the position of the additional member 102.

The wheel-legged robot 100 has both the flexibility of a wheeled robot and the flexibility of a legged robot, so it can move quickly on a flat ground and cross a bumpy road. However, for some wheel-legged robots (similar to the wheel-legged robot 100 illustrated in FIG. 1), merely two contact points exist between the robot and the ground. The wheel-legged robot 100 is a non-minimum phase system, it is still difficult to control the equilibrium of the wheel-legged robot 100 in practical applications. Furthermore, it is difficult to determine dynamic characteristics of the (wheel-legged) robot due to its complex mechanical structure. Because an equilibrium control method in related art needs to know the dynamic characteristics of the robot, it is difficult for the equilibrium control method to control the equilibrium of such a robot without knowing the dynamic characteristics.

A method for building a controller of a robot provided by an embodiment of the present disclosure relates to designing a controller that enables the robot to maintain equilibrium during motion by using an adaptive dynamic programming (ADP) method and/or a whole body dynamic method under the condition that the dynamic characteristics of the robot are unknown. The ADP essentially solves the infinite time domain LQR problem, but the parameters of the system model are completely unknown. Therefore, the well-known algebraic Riccati equation cannot be solved analytically. According to the embodiment of the present disclosure, the solution to the LQR problem can still be obtained through an artificial intelligence scheme under the condition that the LQR problem may not be solved based on a system model.

In some embodiments, the adaptive dynamic programming method may be based on a data-driven policy iteration (PI) scheme.

For example, in combination with an optimal control technology, an embodiment of the present disclosure provides a value iteration method based on the adaptive dynamic programming, and the value iteration method based on the adaptive dynamic programming is capable of calculating a controller that converges to dynamic characteristics corresponding to a robot in response to that the dynamic characteristics of the robot are unknown. The controller corresponding to the precise dynamic characteristics of the robot, that is, the controller corresponding to the optimal solution to the linear quadratic regulation problem, enables the robot to move along the target trajectory with optimal control effects in an equilibrium state. Further, the value iteration method based on the adaptive dynamic programming may also be combined with a policy iteration technology/whole body dynamic control technology so as to provide more flexible robot control.

As an example, a numerical iteration method based on adaptive dynamic programming may not require any initial controller, but the amount of data required is relatively large, and it is more suitable for an offline iteration controller. Although the policy iteration method based on the adaptive dynamic programming requires the initial controller, but the required data size is far less than that of the value iteration method based on the adaptive dynamic programming. Compared with the value iteration method based on the adaptive dynamic programming, the policy iteration method based on the adaptive dynamic programming has shorter iteration time, which makes an iterative controller possible.

An embodiment of the present disclosure solves an optimal equilibrium control problem for a robot controller without knowledge of dynamic characteristics of the robot based on artificial intelligence, such as reinforcement learning and ADP technologies, using policy iteration, numerical iteration, or whole body dynamic control technologies. The process of configuring/building the controller of the embodiment of the present disclosure merely requires that the wheel-legged robot travels for a period of time or a section of trajectory under the control of a non-optimal controller or an arbitrary controller, and collects motion state data and control data corresponding to the period of time or the section of trajectory as training data. Thus, the amount of training data of the embodiment of the present disclosure is much smaller than the amount of data required by a reinforcement learning algorithm in related art.

To facilitate further description of the present disclosure, the meanings of various operators and sets that may be used hereinafter are briefly explained herein.

In the present disclosure, $\mathbb{R}$ represents a set of real numbers. $|\bullet|$ represents the Euclidean norm of a vector. $\otimes$ represents Kronecker product. Bold letters represent vectors or matrices. Italic letters represent scalars.

For any matrix, $A=[a_1, \ldots, a_n]$, $vec(A)=[a_1^T, \ldots, a_n^T]^T$. For any symmetric matrix, $S=[s_{i,j}]$, $vecs(S)=[s_{1,1}, 2s_{1,2}, \ldots, 2s_{1,n}, s_{2,2}, 2s_{2,3}, \ldots, 2s_{n-1,n}, s_{n,n}]^T$. For any vector, $x \in \mathbb{R}^n$, $vecv(x)=[x_1^2, x_1x_2, \ldots, x_1x_n, x_2^2, \ldots, x_n^2]^T$.

FIG. 2 illustrates an exemplary flow diagram of a method for configuring a controller for a robot according to an embodiment of the present disclosure.

As shown in FIG. 2, the method according to at least one embodiment of the present disclosure may include the step S201 to step S203. In some embodiments, the steps S201 to S203 may be performed online or offline, and the present disclosure is not limited thereto.

As described above, the method for building a controller for a robot may be applied to any robot that includes wheel legs, and the wheel legs include driving wheels. For convenience of description, the method for building a controller for a robot is further described next by taking the robot 100 shown in FIG. 1 as an example. The robot 100 of FIG. 1 is further labeled with reference to FIG. 3 in order to describe various characteristic quantities involved in the method for building a controller for a robot. As shown in FIG. 3, the mechanical structure of the robot 100 is more complex, so the accurate dynamic characteristics corresponding to the robot 100 are hard to obtain.

In combination with an optimal control technology, an embodiment of the present disclosure provides a value iteration method based on the adaptive dynamic programming, and the value iteration method is capable of calculating a controller that converges to dynamic characteristics corresponding to a robot in response to that the dynamic characteristics of the robot are unknown. The controller corresponding to the precise dynamic characteristics of the robot, that is, the controller corresponding to the optimal solution to the linear quadratic regulation problem, enables the robot to move along the target trajectory with optimal control effects in an equilibrium state.

First, the motion process of the robot 100 may be mathematically viewed as a continuous-time linear system. It is assumed that a controller corresponding to the optimal solution to a linear quadratic regulation problem exists for the robot 100, the controller is capable of minimizing the cost functional corresponding to the motion process of the robot. For example, the controller corresponding to the optimal solution to the linear quadratic regulation problem may minimize the cost of the robot being near the equilibrium point and the robot may travel along the target trajectory with minimum energy consumption.

In step S201, motion of the robot is controlled, and motion state data and control data of the robot during motion process is obtained, and diversity measures pf the motion state data and the control data are higher than a predetermined threshold;

For example, the processor may control the motion of the robot along a predetermined trajectory, and obtain the motion state data and the control data during the motion process. The predetermined trajectory may be roughly estimated based on structural characteristics, motion characteristics, and dynamic characteristics of the robot to collect motion data of the robot in various motion situations (scenes) so that the diversity measures of the motion state data and the control data are sufficiently high (for example, at least higher than the predetermined threshold).

Control of motion of the robot may be implemented by determining control torque for controlling each joint of the wheel legs of the robot.

Specifically, the processor adaptively determines the control information for controlling rotation of the driving wheels based on historical motion information of the robot; determines first control information for controlling multiple joints based on the control information for controlling rotation of the driving wheel, the first control information allowing the robot to maintain equilibrium; determines second control information for controlling multiple joints based on a target trajectory of the robot, the second control information causing the robot to move along a target trajectory; determines control torque of each joint in the wheel legs of the robot based on the motion constraint condition of the robot, the first control information, and the second control information; drives each joint based on the control torque to control motion of the robot.

Figure 4:
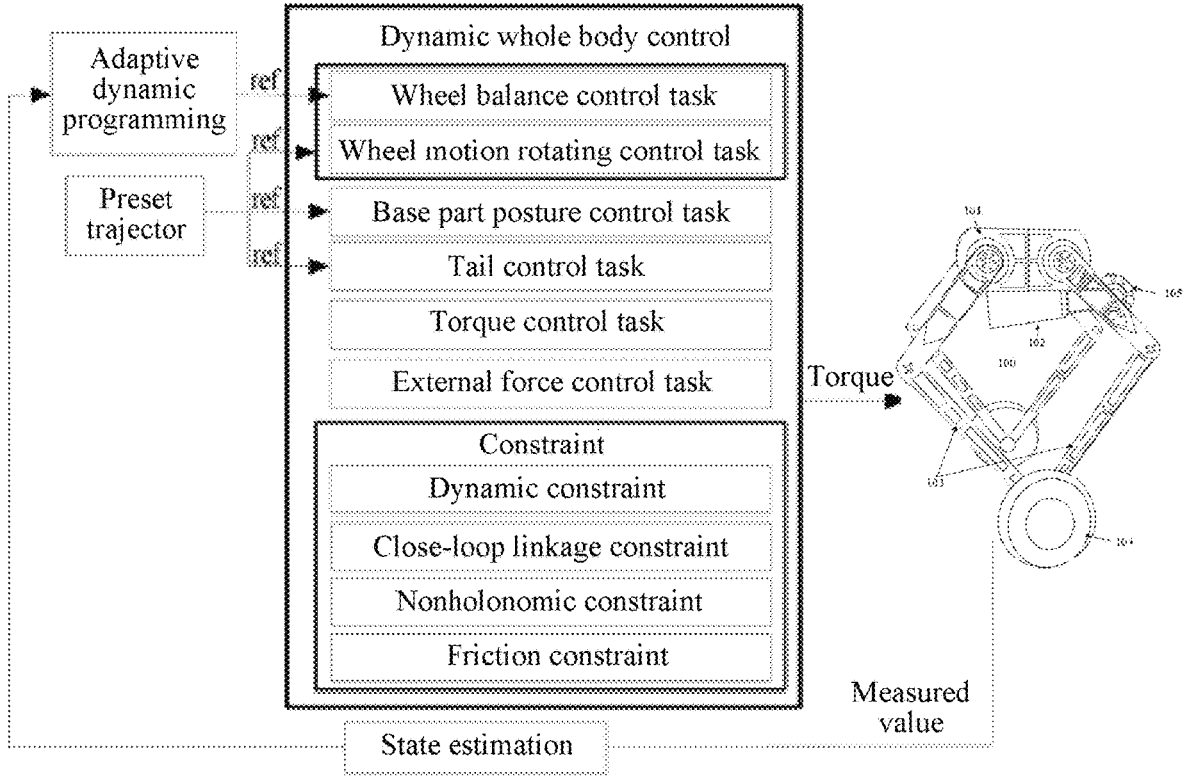
FIG. 4 illustrates a control architecture diagram corresponding to a robot according to an embodiment of the present disclosure.

In some embodiments, adaptively determining the control information for controlling rotation of the driving wheels based on the historical motion information of the robot further includes: determining the control information for controlling rotation of the driving wheels in the policy iteration manner based on the historical motion information of the robot, or determining the control information for controlling rotation of the driving wheels in the value iteration manner based on the motion information of the robot during the motion process. FIG. 4 shows another example, in which the motion state of the robot is estimated by using a measuring value, and the estimated state value is input to a data processing module that adaptively determines the control information for controlling rotation of the driving wheels, so that the data module can learn the measuring value corresponding to each torque more quickly, and the control information for controlling rotation of the driving wheels can be calculated more efficiently.

Further, at least one candidate control torque combination that meets the motion constraint condition of the robot is calculated based on the first control information and the second control information. The value corresponding to the systemic dynamic objective function of the robot is determined based on the at least one candidate control torque combination. The candidate control torque combination, through which the systemic dynamic objective function can reach an extreme value, is selected from the at least one extreme candidate control torque combination corresponding to various joints, and each candidate control torque in the candidate control torque combination is used as the control torque for controlling each joint.

The motion state data includes a pitching angle $\theta$ of the base portion and an angular velocity thereof $\dot{\theta}$, rotation angular velocities $\dot{\phi}_l$ and $\dot{\phi}_r$ of the left and right driving wheels, etc. The motion state data may be collected by a data collector. For example, the data collector may include: a first sensor configured to measure the pitching angle $\theta$ of the base portion and the angular velocity thereof $\dot{\theta}$; and a second sensor configured to measure rotation angular velocities $\dot{\phi}_l$ and $\dot{\phi}_r$ of a left driving wheel and a right driving wheel. The first sensor may be an IMU (Inertial Measurement Unit), which may include a three-axis gyroscope, a three-axis accelerometer or a three-axis magnetometer. The second sensor may be a motor encoder, with a sampling frequency of 200 Hz. The motion state data is further processed, so as to obtain the control data. For example, the control data may include a linear velocity $\dot{x}$, and a yaw angular velocity $\dot{\psi}$ of the robot, etc. For example, the linear velocity $$\dot{x} = \frac{\dot{\phi}_l + \dot{\phi}_r}{2} r_w$$

of the robot 100 may be calculated based on the rotating angular velocities $\dot{\phi}_l$ and $\dot{\phi}_r$ of the left and right driving wheels, where $r_w$ is a radius of the driving wheel. In some embodiments, $r_w$=0.1 m the yaw angular velocity $$\dot{\psi} = \frac{\dot{\phi}_r - \dot{\phi}_l}{w_d} r_w$$

of the robot may also be calculated, where $w_d$ is a robot width, in some embodiments, $w_d$=0.47 m.

In one example, the diversity measures may be represented by information entropy, and both the represented motion state data and the control data exist enough non-repetitive/non-similar values. In another example, the diversity measures may also be represented by a data characteristic quantity.

At this time, the robot may be controlled to move along a predetermined trajectory by an arbitrary controller. For example, the robot may be manually controlled to move linearly in different accelerations, regardless of whether the robot is in a state of equilibrium stability motion. According to the robot illustrated in FIGS. 1 to 4, if the driving wheel 104 provides an excessive large acceleration, the robot 100 will quickly topple backward. If the driving wheel 104 provides a too small acceleration, the robot may not reach the destination quickly and may topple forward.

In step S202, according to the motion state data and the control data, the linear equilibrium parameter matrix is calculated by using the value iteration manner.

For example, the step S202 in FIG. 2 may further include: determining an iteration target item, and respectively performing integral operation on the motion state data and the control data according to a time interval, so as to build an iteration relationship function; and preforming value iteration on the iteration target item according to the iteration relationship function to approximate to obtain the linear equilibrium parameter matrix corresponding to the dynamic characteristics of the robot.

Exemplarily, the integral operation may be respectively performed on the motion state data and the control data, corresponding to a plurality of time intervals, so as to build the iteration relationship function. The motion state data and the control data after the integral operation are used as the training data, which participates in the process that the value iteration is performed on the iteration target item to approximate to obtain the linear equilibrium parameter matrix corresponding to the dynamic characteristics of the robot.

The matrix is built to be used as the training data by collecting the motion state data and the control data of the robot with unknown dynamic characteristics before losing equilibrium (falling) and performing integral operation on these data. Therefore, in an embodiment of the present disclosure, the quantity of the training data is far less than that required by a reinforcement learning algorithm in related art. An embodiment of the present disclosure also correspondingly builds an iterative relationship function to gradually converge the target iteration term as the learning step size increases.

Further, according to the embodiment of the present disclosure, the trained controller gradually converges to a controller corresponding to the optimal solution to the linear quadratic regulation problem as the learning step increases, so that stability of a close-loop system can be ensured, the training process is greatly simplified, and additional limitations on training data are not required, so as to simplify the design process of a controller for a wheel-legged robot. Further, in the embodiments of the present disclosure, the data is collected from real robots, and the control policy obtained based on the data of the real robots is directly applied to the robot, so that the application effect of the controller on the real robots is improved without considering the difference between the simulated control and the real control.

Moreover, the converged target iteration term may obtain a controller, the controller converges to a controller corresponding to the optimal solution to the linear quadratic regulation problem, so that the stability of the close-loop system may be guaranteed, and the training process is greatly simplified. The whole process does not require additional limitations on the training data, to simplify the design process of the controller of the robot.

In step S203, the controller corresponding to dynamic characteristics of the robot is built based on the linear equilibrium parameter matrix.

In some embodiments, the controller corresponding to the dynamic characteristics of the robot is a linear controller, and for each moment during the motion process, the control torque provided by the controller corresponding to the dynamic characteristics of the robot is negatively correlated to the product of the linear equilibrium parameter matrix and the motion state data of the robot.

In combination with an optimal control technology, an embodiment of the present disclosure provides a value iteration method based on the adaptive dynamic programming, and the value iteration method based on the adaptive dynamic programming is capable of calculating a controller that converges to dynamic characteristics corresponding to a robot in response to that the dynamic characteristics of the robot are unknown. The controller corresponding to the precise dynamic characteristics of the robot, that is, the controller corresponding to the optimal solution to the linear quadratic regulation problem, enables the robot to move along the target trajectory with optimal control effects in an equilibrium state.

In one example of the present disclosure, the motion state data and the control data that meet the diversity measure may be collected by the following methods.

As shown in FIG. 5, for example, the processor may firstly control the drive motor to output a first torque, so that the robot loses equilibrium due to low velocity motion. For example, the first torque may be a small value, so that in response to that the driving motor is controlled to output the first torque, the center of mass of the base portion of the robot is first raised and then lowered, and the front end of the base portion of the robot comes into contact with the ground when it loses equilibrium. That is, the robot rushes forward from a lowered state (a state in which the center of mass of the base portion is lower), but since the force of the rush is not large enough, the robot raises its head halfway and lowers it.

And then, the processor may also control the drive motor to output a second torque, so that the robot loses equilibrium due to high velocity motion. For example, the second torque may be a larger value, and in response to that the driving motor is controlled to output the second torque, the center of mass of the base portion of the robot is first raised and then lowered, and the rear end of the base portion of the robot is in contact with the ground when it loses equilibrium. That is, the robot rushes forward from a lowered state (a state in which the center of mass of the base portion is low, but since the force of the rush is excessively large, the robot topples backwards when passing the equilibrium point (the highest point of the center of mass of the base portion).

And then, the processor may also control the drive motor to output a third torque, so that the robot maintains the equilibrium state for a period of time. When the driving motor is controlled to output the third torque, the center of mass of the base portion of the robot remains unchanged in height when the robot maintains the equilibrium state.

Or the processor controls the drive motor to output a fourth torque, so that the robot maintains the equilibrium state for a period of time, and the robot in the equilibrium-like state is near an equilibrium point (e.g., a difference between a state of the robot and the equilibrium point is below a threshold) during the motion process. The base portion of the robot shakes back and forth in response to that the drive motor is controlled to output the fourth torque and the robot maintains the equilibrium-like state.

As mentioned above, the processor may manually input instructions in a remote controller, and these instructions are sent to the remote controller. After receiving the instructions, the remote controller may determine its corresponding control data. Then rotation of the robot is controlled according to the control data of the remote controller, and the motion state data during the motion process is obtained. In some embodiments, since reaction speeds of human eyes and hands are hard to meet the control requirements of the robot, the equilibrium of the robot is hard to be manually controlled. That is, not as the equilibrium-like controller, the remote controller usually leads the robot to lose equilibrium.

For example, as illustrated in FIG. 3, the complex robot 100 illustrated in FIG. 1 may be labeled in a generalized coordinate system of the robot. For ease of labeling, in FIG. 3, the centers $P_1$ and $P_2$ of the driving wheels are illustrated as two separate points. It is to be understood by a person skilled in the art that $P_1$ and $P_2$ are substantially the same point.

Specifically, in FIG. 3, the parameters of each joint involved in the wheel legs are respectively identified by $q_{\{\cdot,\cdot\}}$ and $\tau_{\{\cdot,\cdot\}}$, where $q_{\{\cdot,\cdot\}}$ identifies a rotation angle of a joint, and $\tau_{\{\cdot,\cdot\}}$ identifies torque of a joint. For example, $q_{\{1,2\}}$ identifies a rotation angle of a joint between a first link of the left wheel leg of the robot and the base portion, and $\tau_{\{1,2\}}$ identifies rotation torque of the joint between the first link of the left wheel leg of the robot and the base portion. Although not illustrated in FIG. 3, angle and rotation torque of a tail joint may be set correspondingly.

For any robot with the base portion, $q=[q_{fb}{}^T, q_J{}^T]^T$ may be used to represent the generalized coordinates of the robot. The generalized coordinates $q=[q_{fb}{}^T, q_J{}^T]^T$ of the robot include a posture $q_{fb} \in \mathbb{R}^3 \times SO(3)$ of the base portion and $n_J$ joint angles $q_J=[q_1, q_2, \ldots, q_{n_J}]^T$. For the robot shown in FIG. 1 and FIG. 3, the generalized coordinates q of the robot may be similarly obtained, where $n_J=12$ and $q_i$ may be any one of joints labeled by $q_{\{\cdot,\cdot\}}$ in FIG. 3.

Based on the generalized coordinates q of the robot, a generalized velocity set $\dot{q}=[\dot{q}_{fb}{}^T, \dot{q}_J{}^T]^T$ and a generalized acceleration set $\ddot{q}=[\ddot{q}_{fb}{}^T, \ddot{q}_J{}^T]^T$ of the robot joint may be determined. Those skilled in the art may understand that $\dot{q}_{fb}$ and $\ddot{q}_{fb}$ respectively represent an instantaneous angular velocity and an instantaneous angular acceleration of the robot body. Similarly, the joint torque may also be labeled by $\tau=[\tau_1, \tau_2, \ldots, \tau_8]^T$.

Therefore, a general dynamical model shown in the following equation (1) may be built.

$$M(q)\ddot{q}+C(q,\dot{q})=S^T\tau+J_f^T f+J_\lambda{}^T \lambda \qquad (1)$$

where $M(q) \in \mathbb{R}^{(6+n_J) \times (6+n_J)}$ and M(q) are used to represent the mass matrix of the robot. $C(q, \dot{q}) \in \mathbb{R}^{(6+n_J)}$ is used to represent gravity, centrifugal, and Coriolis force terms of the robot. $S=[O_{n_J \times 6} I_{n_J \times n_J}]$, the matrix S is used to select an active joint from all joints, where if an element value of some elements in S is 0, it means that it is a joint without drive, and if the element value is not 0, it indicates that it is an active joint. f is a generalized force provided by the ground at a contact point when the robot is in contact with the ground. $J_f \in \mathbb{R}^{3n_c \times (n_J+6)}$, $J_f$ is a concatenated contact Jacobian matrix for f. λ is a close-loop force of the front leg acting on the back leg. $J_\lambda \in \mathbb{R}^{3n_\lambda \times (n_j+6)}$, $J_\lambda$ is a concatenated contact Jacobian matrix for λ. $n_c$ is the number of contact points between the driving wheels and the ground. Considering close-loop constraints (that is, on a real robot, each joint of the robot is to be fixedly connected), $n_\lambda$ is the number of contact points between open-loop links. For the robot shown in FIG. 1 and FIG. 3, $n_c$=2 and $n_\lambda$=2. Specifically, the wheel legs of the robot are a five-link mechanism. The number of contact points between the open-loop links of the close-loop constraint of the five-link mechanism (for example, between (such as, between $P_1$ and $P_2$ points in FIG. 3) is two.

On the basis of obtaining the robot configuration, the corresponding control architecture and control tasks may be set for the robot in consideration of the traveling process of the robot, and the control architecture and the control tasks can be described by mathematical language. The above control architecture and the control tasks are further described below with reference to FIG. 4. FIG. 4 illustrates a control architecture diagram corresponding to a robot according to an embodiment of the present disclosure. Specifically, taking the robot labeled in FIG. 3 as an example, FIG. 4 illustrates multiple exemplary control tasks for the robot and the association between the control tasks. Combination and association of these exemplary control tasks is further referred to as corresponding dynamic whole body dynamic control of the robot.

In some embodiments, the control information for controlling rotation of the driving wheel may be the acceleration of the driving wheel or the torque of the driving wheel. Mathematically speaking, although these two physical quantities have no great difference as the control information for controlling rotation of the driving wheels, in an actual physical system, not both the physical quantities may be accurately measured. Therefore, in an experiment, those skilled in the art may select the physical quantities with better data testing effects and relatively conforming to the model for subsequent calculation and iteration according to specific situations.

For example, the rotating speed of the driving wheel can not only affect the linear velocity of the robot, but also affect the advancing equilibrium of the robot. For the robot 100 shown in FIG. 1 to FIG. 3, if the driving wheel 104 provides an excessive acceleration, the robot 100 will quickly fall backwards. Therefore, in an embodiment of the present disclosure, the control information of the driving wheel is used as reference information for controlling various joints, to maintain the equilibrium of the robot dynamically by regulating the robot configuration, for example, reducing center of gravity/rising the center of gravity in response to that the driving wheel 104 has a fast velocity. As an example, referring to FIG. 4, the control information may describe the output of the wheel equilibrium control task in detail below.

If the driving wheel 104 provides a too small acceleration, the robot may not reach the destination quickly, so as not to meet the requirements of the target trajectory required for the motion of robot 100. For this purpose, the robot 100 shown in FIGS. 1 and 3 can further convert potential energy into kinetic energy to assist in robot motion by adjusting the posture of the base. In addition, form some rotating target trajectories, for example, a S-shaped curve walked by the robot, the target trajectory will be also used as a reference, so as to assist the robot in adjusting its posture and velocity. As an example, referring to FIG. 4, the second control information may describe the output of any one of the wheel movement, rotating control task, posture control task of the base portion, and the tail control task in detail below.

For example, the whole body dynamic control corresponding to the robot may be described that various joints of the robot is controlled with a target of minimizing the total input energy for various joints and minimizing the error among the target trajectories, in response to that the robot equilibrium is ensured. For example, the equation (2) may be used to represent the whole body dynamic control target $$\underset{(\tau,f,\lambda)}{\arg\min} z$$

of the robot labeled in FIG. 3.

$$\underset{(\tau,f,\lambda)}{\arg\min} z = \left\| \ddot{q}^{des} - \ddot{q} \right\|_{W_q}^2 + \left\| \tau^{des} - \tau \right\|_{W_\tau}^2 + \left\| f \right\|_{W_f}^2 + \left\| \lambda \right\|_{W_\lambda}^2 \qquad (2)$$

where, as above, $\ddot{q}^{des}$ is the vector formed by the acceleration set and combination that are set by the target trajectory for various joints. $\ddot{q}$ is the vector formed by the acceleration set and combination of various joints during the motion process. $\tau^{des}$ is the vector formed by the torque set and combination that are set by the target trajectory for various joints. $\tau$ is the vector formed by the torque set and combination of various joints during the actual motion process. f is the generalized force provided by the ground at the contact point when the robot is in actual contact with the ground. λ is the closed-loop force that the front leg part of the robot acts on the rear leg part during the motion process. Subscripts $W_q$, $W_T$, $W_f$, $W_\lambda$ label the weight coefficient matrix that needs to be multiplied in the norm of the computational equation (2) by $\ddot{q}$, τ, f and λ.

As illustrated in FIG. 4, the controller determined by adaptive dynamic programming will be used to control the driving wheels illustrated in FIG. 1 and FIG. 3. The motion state and the dynamic state of the driving wheel will correspondingly provide input reference or input limit to each control task, thus changing the posture and the equilibrium state of the robot. Correspondingly, in order to avoid the robot losing equilibrium, the active joint (such as, $q_{\{1,2\}}$ and $q_{\{7,8\}}$) in FIG. 3 will rotate under the combined action of the active wheel (for example, $q_{\{5,6\}}$), the joints without drive (for example, $q_{\{3,4\}}$ and $q_{\{9,10\}}$) and the joint torque (for example, $\tau_{\{1,2\}}$ and $\tau_{\{5,6\}}$), to adjust the posture of the robot so that the robot maintains equilibrium.

As shown in FIG. 4, the rotation of the driving wheel under the control of the adaptive dynamic programming controller will provide input reference Ref to the wheel equilibrium control task (and/or wheel advancing and rotating control tasks). The target trajectory will provide an input reference to the wheel traveling and rotation control task, a base portion posture control task, and a tail control task. Although the driving wheel and the target trajectory do not directly provide an input reference to other control tasks (for example, a torque control task and an external force control task), considering that each control task often needs to control the same robot component (for example, a main wheel, a link component, a joint hinge), the control effects of these control tasks are often limited by the driving wheel and the target trajectory.

With further reference to FIG. 4, the motion of the robot is also limited by various constraints, for example, the limitations such as the maximum torque that each joint may provide, and the mechanical configuration. Four example constraints, a dynamic constraint, a close-loop linkage constraint, a nonholonomic constraint and a friction constraint, are given in FIG. 4.

As an example, the dynamic model illustrated in equation (1) may be used as an example of a dynamic constraint to limit the range of energy change during the motion process of the robot. It is to be understood by a person skilled in the art that the limitations of the dynamic model are not limited thereto. For example, in order to facilitate analysis of the energy change of the robot, a simplified dynamic model may be established for the robot to simplify the dynamic model limitation corresponding to equation (1) in the dynamic whole body dynamic control.

As another example, equation (3) illustrates an example of a close-loop linkage constraint for the robot in FIG. 3. It is to be understood by a person skilled in the art that the close-loop linkage constraint may also be illustrated in other ways. The present disclosure is not limited thereto.

$$J_{\lambda}\ddot{q}+\dot{J}_{\lambda}\dot{q}=0 \tag{3}$$

where $J_{\lambda}^{T}=[J_{P_1,l}^{T}-J_{P_2,l}^{T}\ J_{P_1,r}^{T}-J_{P_2,r}^{T}]^{T}$. $J_{P_1}$ and $J_{P_2}$ are the Jacobian matrix corresponding to points $P_1$ and $P_2$ respectively. Subscripts $J_{\bullet,l}$ and $J_{\bullet,r}$ label the left wheel legs and the right wheel legs of the robot respectively.

As another example, assuming that the wheel is pure rolling and in contact with the ground, slippage and sliding do not exist in radial and axial directions of the wheel, and equation (4) shows an example of the nonholonomic constraint for the robot in FIG. 3. It is to be understood by a person skilled in the art that the nonholonomic constraint may also be illustrated in other ways. The present disclosure is not limited thereto.

$$_{B}J_{w}^{(1,3)}\ddot{q}_{B}+\dot{J}_{w}^{(1,3)}\dot{q}=0 \tag{4}$$

where $_{B}J_{w}^{(1,3)}$ are the x-axis and z-axis of Jacobian matrix of the driving wheel-ground contact point relative to the base portion.

Continuing the example in FIG. 4, setting of the friction constraint may be based on the assumption: the friction cone at the contact point between the ground and the robot in the actual motion process is approximated as a friction pyramid. In the local coordinate system of the contact force $f_i$ corresponding to each contact point, a friction coefficient is given, and the friction constraint may be expressed as $|f_{i,x}|\leq\mu_{i,z}$ and $|f_{i,y}|\leq\mu f_{i,z}$.

In addition to the four kinds of constraints illustrated in FIG. 4, a one-sided constraint may be set correspondingly. An example of the one-sided constraint may be $f_{i,z}>0$. Certainly, the present disclosure is not limited thereto.

Control models of various control tasks may be determined correspondingly, subject to the various constraints described above. Specifically, the rotation of the driving wheel under the control of the adaptive dynamic programming controller will provide an input reference to the wheel equilibrium control task, while the target trajectory will provide an input reference to the other control tasks. For example, the rotation speed of the driving wheel will have an influence on the posture and the speed of the base portion, and the posture and the speed of the base portion will have an influence on the equilibrium state of the robot.

As an example of a wheel equilibrium control task, to control the motion of the base portion, the desired acceleration $\ddot{q}_{fb}$ of the base portion may be calculated by a PD control law (Proportional Derivative Controller). In one example, at least part of the PD control law is derived based on an input reference for a posture and an input reference for a velocity.

Specifically, the input reference for the posture, also referred to as a reference posture, indicates: due to rotation of the driving wheel under control of the adaptive dynamic programming controller, the posture of each joint except the joint $q_{\{5,6\}}$ changes. The input reference for the velocity, also referred to as a reference velocity, indicates: due to rotation of the driving wheel under control of the adaptive dynamic programming controller, the velocity of each joint except the joint $q_{\{5,6\}}$ changes.

That is, $\ddot{q}_i^{des}$ in equation (2) may be approximately expressed by using equation (5).

$$\ddot{q}_i^{des} = \begin{cases} k_{q,p}(q_i^{ref}-q_i)+k_{q,d}(\dot{q}_i^{ref}-\dot{q}_i), & i \neq 5, 6, \\ 0, & i = 5, 6 \end{cases} \tag{5}$$

In addition, $\tau_i^{des}$ in equation (2) may be further approximately expressed by using equation (6). In equation (6), it is assumed that the torque of other joints $\tau_i^{des}$ ($i\neq3,4$) except the joint $q_{\{5,6\}}$ is approximately zero.

$$\tau_i^{des} = \begin{cases} \tau^{ADP}, & i = 3, 4, \\ 0, & i \neq 3, 4 \end{cases} \tag{6}$$

For another example, taking the robot described in FIGS. 1 to 3 as an example, the input reference for the posture includes: the distance from the center of gravity of the robot to the center of the driving wheel connection line projected on the ground (for example, identified by state_com_p). The input references for the velocity include: the velocity derived based on the difference from the center of gravity of the robot to the center of the driving wheel connection line projected on the ground (for example, identified by state_com_v), and the linear velocity of the driving wheel (identified by wheel_x_v). In the above PD control law, at least one of the reference acceleration and the reference torque of the driving wheel may be solved by taking state_com_p, state_com_v, and wheel_x_v as input states.

For another example, taking the robot described in FIG. 1 to FIG. 3 as an example, the input reference for the posture may further include: the equivalent tilt angle of the base portion. Specifically, the equivalent tilt angle theta_equi may be solved by state_com_p and the center of mass height. For example, theta_equi=a tan(state_com_p/height). The input references for the velocity include: is the acceleration of the equivalent tilt angle theta_dot_equi. Specifically, the equivalent tilt angle may be solved by state_com_v and the center of mass height. For example, theta_dot_equi=state_com_v/height. In the above PD control law, the reference acceleration/torque of driving wheels can be solved by equivalent inclination angle and equivalent inclination angle acceleration.

The walking robot 100 is taken as an example for explanation. The robot 100 in an equilibrium state may be in a stable equilibrium state in a linear motion dimension or a rotational motion dimension. For example, the robot 100 in the equilibrium state may maintain the same or very similar state to a state defined by the equilibrium point during the motion process, or may return to the state defined by the equilibrium point with the fastest velocity or minimum energy consumption during the motion process. The state defined by the equilibrium point may be such that the robot 100 is in a state in which a pitch angle is zero, an angular velocity corresponding to the pitch angle is zero, and a linear velocity is at the target velocity. For example, the posture of the robot 100 is a state of being vertically upward, and the robot 100 does not have a velocity in the rotation motion dimension but merely has a target velocity in the linear motion dimension.

The robot 100 in the equilibrium-like state is in a state defined in the vicinity of the equilibrium point during the motion process. For example, the robot 100 may be in an intermediate state transiting from the stable equilibrium state to the unstable equilibrium state in the linear motion dimension and the rotation motion dimension. The robot 100 in the equilibrium-like state may require the driving wheel to provide greater force and torque during the motion process, so as to ensure that the robot 100 does not fall. For example, the robot 100 may incline left and right at this time, and the robot 100 not only processes the velocity in the linear motion dimension, but also processes the velocity in the rotating motion dimension. Notably, the robot 100 in the equilibrium-like state herein may also be in a nearly unstable equilibrium state in the linear motion dimension or the rotation motion dimension at some moments in motion, as long as the robot may be restored to a state capable of normally traveling by the driving force of the driving wheels 104.

As an example, if the robot 100 moves straight merely under the control of the driving wheels 104, the robot 100 in an equilibrium state may always move straight at a uniform speed with a vertically upward posture, that is, the central axis of the base portion of the robot 100 in the unstable equilibrium state may be perpendicular to the horizontal line at all times and does not have a velocity or acceleration in the rotation motion dimension. However, the base portion of the robot 100 in the equilibrium-like state may have a tilt angle (pitch angle) and at least one of a velocity and an acceleration in the rotation motion dimension.

Thus, the amount of training data of the embodiment of the present disclosure is much smaller than the amount of data required by a reinforcement learning algorithm in related art. Further, according to the embodiment of the present disclosure, the trained controller gradually converges to a controller corresponding to the optimal solution to the linear quadratic regulation problem as the learning step increases, so that stability of a close-loop system can be ensured, the training process is greatly simplified, and additional limitations on training data are not required, so as to simplify the design process of a controller for a wheel-legged robot. In addition, an embodiment of the present disclosure may perform data collection directly on the real robot, and the controller, obtained by training, is directly applied to the real robot. An embodiment of the present disclosure is not necessary to perform data collection in a simulator based on a physical engine, so some problems, caused by the migration of the data from a virtual world to a real work are omitted.

In some embodiments, an embodiment of the present disclosure also provides a method for controlling a robot by using dynamic characteristics corresponding to the robot correspondingly. The method is executed by a processor, the robot is driven by at least one driving wheel to move, and the method includes: receiving a motion instruction indicating a motion trajectory of the robot; applying a driving force to the driving wheel according to the motion instruction, so that the robot moves according to the motion trajectory; obtaining motion state data and control data of the robot during a motion process, and diversity measures of the motion state data and the control data are higher than a predetermined threshold; calculating a linear equilibrium parameter matrix by using a value iteration manner based on the motion state data and the control data; building a controller corresponding to dynamic characteristics of the robot based on the linear equilibrium parameter matrix; and controlling the driving force applied to the driving wheel by using the controller, so that the robot moves stably along the target trajectory. The robot under the control of the controller corresponding to the dynamic characteristics of the robot is closer to the equilibrium point during the motion process.

Therefore, the method for controlling the robot in the embodiment of the present disclosure enables a robot with unknown dynamic characteristics to learn data during the motion process, and gradually improves/generates a controller corresponding to the dynamic characteristics of the robot, and finally realizes smooth motion. Since the control input of the non-optimal controller may be used to control motion of the robot for a period of time to obtain training data, in such cases, the embodiment of the present disclosure enables improvement of a non-optimal controller in response to that the dynamic characteristics are unknown or the dynamic characteristics are changed, and a controller corresponding to the (precise) dynamic characteristics of the robot is generated. That is, the embodiment of the present disclosure may enable the robot to be flexibly controlled without a precise dynamic model.

For example, the motion process of the robot 100 may be mathematically viewed as a continuous-time linear system. It is assumed that a controller corresponding to the optimal solution to a linear quadratic regulation problem exists for the robot 100, the controller is capable of minimizing the cost functional corresponding to the motion process of the robot. For example, the controller corresponding to the optimal solution to the linear quadratic regulation problem may minimize the cost of the robot being near the equilibrium point and the robot may travel along the target trajectory with minimum energy consumption.

As an example, the linear quadratic regulation problem may be defined by equation (7), which indicates that, in the case of $\dot{x}=Ax+Bu$, a controller that may minimize the cost functional J of a continuous-time linear system is solved. Similarly, $A\in \mathbb{R}^{n\times n}$ and $B\in \mathbb{R}^{n\times 1}$.

$$\min J=\int_0^\infty x^T(t)Qx(t)+Ru^2(t)dt$$

$$s.t. \ \dot{x}=Ax+Bu, \tag{7}$$

where J is the cost functional of the continuous-time linear system, and Q is a real symmetric and positive semi-definite matrix, $Q\in \mathbb{R}^{n_p\times n_p}$. $(A, \sqrt{Q})$ is observable, and R>0. x is related to a robot configuration and a wheel equilibrium task. For example, referring to the example in FIG. 4, if a controller needs to be determined for a driving wheel, then x may include a pitch angle, a pitch angular velocity, and a linear velocity of the robot, and u is the sum of the input torques of the two wheels.

According to an optimal control theory, mathematically, the Algebraic Riccati equation (equation (8)) may be taken as the solution to the following linear quadratic regulation (LQR) problem defined by equation (7).

$$A^T P^* + P^* A - \frac{1}{r} P^* BB^T P^* + Q = 0 \tag{8}$$

where u*(t) is a controller corresponding to the optimal solution to the linear quadratic regulation problem, u*(t)=−K*x(t), where $$K^* = \frac{1}{R} B^T P^*$$

and P* is a matrix meeting $$A^T P^* + P^* A - \frac{1}{R} P^* B B^T P^* + Q = 0.$$

If the precise dynamic characteristics of the robot 100 are known, then matrices A and B in equation (7) and equation (8) are known. In response to that the matrices A and B in equation (7) and equation (8) are known, u*(t) may be correspondingly solved.

However, as described above, in response to that the precise dynamic characteristics of the robot 100 are unknown, or merely part of the dynamic characteristics of the robot 100 may be determined, the above optimal controller u*(t)=−K*x(t) may not be determined in practical applications. Further, P in equation (7) and equation (8) is not linear, making it difficult to solve an accurate P*.

In various aspects of the embodiment of the present disclosure, the above optimal controller u*(t)=−K*x(t) is determined by a policy iteration scheme in response to that the precise dynamic characteristics of the robot 100 are unknown or variable parameters in the dynamic characteristics change, or in response to that merely part of the dynamic characteristics of the robot 100 may be determined. Specifically, according to a related theory of policy iteration, it may determine correspondingly:

$K_0 \in \mathbb{R}^{1 \times n}$ $K_0 A - B K_0 K_k K_k K^*$ $\lim_{k \to \infty} K_k = K^*$ existence of is assumed, is a stability control gain matrix. That is, is Hurwitz. Then, if is constantly updated by the equation (9), will approach to, that is $K_0 \in \mathbb{R}^{1 \times n}$ $K_0 A - B K_0 K_k K_k K^*$, when k approaches to be positive infinity.

$$K_0 \in \mathbb{R}^{1 \times n} K_0 A - B K_0 K_k K_k K^* \tag{9}$$

$$K_{k+1} = \frac{1}{R} B^T P_k$$

In the equation (9), $P_k > 0$, and $P_k$ is the solution of the Lyapunov equation. For the example of the Lyapunov equation, sees equation (10).

$$A_k^T P_k + P_k A_k + K_k^T R K_k + Q = 0 \tag{10}$$

In equations (9) and (10), k=0, 1, 2, . . . , $A_k = A - B K_k$. Similarly to $K_k$, $\lim_{k \to \infty} P_k = P^*$. Thus, equations (9) and (10) describe the relationship among $K_{k+1}$, $K_k$ and $P_k$.

Thus, partially based on the above equations (9) and (10), the scheme for updating the linear equilibrium parameter matrix of the controller by the value iteration may be exemplarily determined.

Further, a non-linear combination is performed on the motion state data and the control data according to the time interval so as to determine the training data set, and the iteration relationship function is determined based on the training data set; according to the iteration relationship function, performing multiple policy iterations on the iteration target item to approximate to obtain a linear equilibrium parameter matrix corresponding to the dynamic characteristics of the robot.

According to description of FIGS. 1 to 4, the controller $u_0$ may be used to control motion of the robot and correspondingly collect motion state data and control data corresponding to multiple time intervals. Specifically, for example, for a control policy $u=u_0$, the close-loop system may be illustrated by equation (11).

$$\dot{x} = Ax + Bu_0 \tag{11}$$

Then, by equation (9) and equation (10), along the trajectory defined by equation (11), the derivative of $x(t)^T P_k x(t)$ with respect to time may be illustrated in an exemplary manner by equation (12).

$$\frac{d}{dt}\left(x(t)^T P_k x(t)\right) = x(t)^T \left(A^T P_k + P_k A\right) x(t) + 2 u_0 B^T P_k x(t) = \tag{12}$$

$$x(t)^T \left(A_k^T P_k + P_k A_k\right) x(t) + 2(K_k x(t) + u_0) B^T P_k x(t) =$$

$$-x(t)^T \left(Q + K_k^T R K_k\right) x(t) + 2(K_k x(t) + u_0) R K_{k+1} x(t) =$$

$$-x(t)^T Q_k x(t) + 2(K_k x(t) + u_0) R K_{k+1} x(t)$$

where $Q_k = Q + K_k^T R K_k$.

Further, the motion state data is collected by a sensor at a certain time interval over a period of time and respectively corresponds to the motion state of the robot at each discrete moment over a period of time. Thus, the motion state data and the control data of the controller may correspond to multiple time intervals in $[t_0, t_r]$. Any time interval t to t+δt in the multiple time intervals may be marked as [t, t+δt], and the duration δt may be determined according to a data collection time interval that may be achieved by the robot sensor.

The motion state data and the control data corresponding to multiple time intervals may be respectively nonlinearly combined for building an iteration relationship function. The motion state data and the control data after integral operation will be used as training data to participate in the process of performing policy iteration on the iteration target item, to approximate to obtain a linear equilibrium parameter matrix corresponding to the dynamic characteristics of the robot. Notably, the following description is merely an exemplary integral operation and the present disclosure is not limited thereto.

For example, an exemplary equation (13) may be determined by taking the integral of both sides of equation (12) in a time interval [t, t+δt] and rearranging equation (12).

$$x(t+\delta t)^T P_k x(t+\delta t) - x(t)^T P_k x(t) - 2 \int_t^{t+\delta t} (K_k x(t) + u_0) R K_{k+1} x d\tau = -\int_t^{t+\delta t} x(t)^T Q_k x(t) d\tau. \tag{13}$$

In order to determine variables $P_k$ and $K_{k+1}$, equation (13) may be iterated at multiple time intervals. For example, r is specified to be a large enough integer, and for all i=0, 1, . . . , r−1, $\delta t \le t_{i+1} - t_i$.

According to equation (13), the integral of the motion state data in time between any two adjacent moments t and t+δt may be related to at least one of the following items: a quadratic term of the motion state data at the moment t, a quadratic term of the motion state data at the moment t+δt, a product of the motion state data at the moment t and the motion state data at the moment t+δt, a product of the control data at the moment t and the motion state data at the moment t, a product of the control data at the moment t+δt and the motion state data at the moment t+δt and the like. In some embodiments, the control data at the moment t is control data for controlling the robot to travel using the controller.

To facilitate further description of the policy iteration process, for a given integer r, the embodiment of the present disclosure may define the following three matrices as example elements in the training data set, a first matrix $\Delta_{xx}$, a second matrix $\Sigma_{xx}$, and a third matrix $\Sigma_{xu}$ in equation (14). The first matrix $\Delta_{xx} \in \mathbb{R}^{r \times n^2}$, the second matrix $\Sigma_{xx} \in \mathbb{R}^{r \times n^2}$ and $\Sigma_{xu} \in \mathbb{R}^{r \times n}$. Each matrix corresponds to a non-linear combination of the motion state data and the control data in multiple time intervals, for example, involving integral operation and product calculation.

$$\Delta_{xx} = [x \otimes x|_{t_0}^{t_0+\delta_t}, x \otimes x|_{t_1}^{t_1+\delta_t}, \dots, x \otimes x|_{t_r}^{t_r+\delta_t}]^T \qquad (14)$$

$$\sum\nolimits_{xx} = \left[ \int_0^{t_0+\delta_t} x \otimes x d\tau, \int_{t_1}^{t_1+\delta_t} x \otimes x d\tau, \dots, \int_{t_r}^{t_r+\delta_t} x \otimes x d\tau \right]$$

$$\sum\nolimits_{xu} = \left[ \int_0^{t_0+\delta_t} x u_0 d\tau, \int_{t_1}^{t_1+\delta_t} x u_0 d\tau, \dots, \int_{t_r}^{t_r+\delta_t} x u_0 d\tau \right]$$

where $0 \leq t_0 < t_1 < \dots < t_r$. The operator $\otimes$ represents a Kronecker product.

For example, for the robot 100 described in FIGS. 1 to 4, any element $x \otimes x|_{t_i}^{t_i+\delta_t}$ in the first matrix $\Delta_{xx}$ corresponds to a product of any two terms of a base portion pitch angle, a base portion pitch angular velocity, and a linear velocity of the driving wheel at the moment $t_i$ and the moment $t_i+\delta_t$, or a difference between quadratic terms of any one term. Any element $\int_{t_i}^{t_i+\delta_t} x \otimes x \, d\tau$ in the second matrix $\Sigma_{xx}$ corresponds to a product of any two terms of the base portion pitch angle, the base portion pitch angular velocity, and the linear velocity of the driving wheel at the moment $t_i$ and the moment $t_i+\delta_t$, or an integral of quadratic terms of any one term. Any element $\int_{t_i}^{t_i+\delta_t} x \, u_0 \, d\tau$ in the third matrix $\Sigma_{xu}$ corresponds to the integral of the product of any item of the base portion pitch angle, the base portion pitch angular velocity, the linear velocity of the driving wheel at the moment $t_i$ and the moment $t_i+\delta_t$ and the driving force. Configurations of different robots correspond to different matrices, the above is illustrated merely as an example, and the present disclosure is not limited thereto.

Next, for different t, for example, $t=t_0, t_1, \dots, t_r$, and the system of equations of equation (13) may be written exemplarily in the form of equation (15). It is to be understood by a person skilled in the art that different linear combination ways of training data will correspondingly affect the forms of the built iteration relationship functions. The iteration relationship function (for example, equation (15)) obtained based on equation (13) is given below exemplarily merely, where iteration target terms include a linear equilibrium parameter matrix to be iterated and a solution to a Lyapunov equation with the linear equilibrium parameter matrix to be iterated as a parameter. Of course, the present disclosure is not limited thereto.

$$\Omega_k \begin{bmatrix} vec(P_k) \\ vec(K_{k+1}) \end{bmatrix} = \Xi_k \qquad (15)$$

where vec(•) identifies vectorization of a content within a bracket. In addition, $\Omega_k \in \mathbb{R}^{r \times (n^2+n)}$ and $\Xi_k \in \mathbb{R}^r$ may be defined in a form illustrated in equation (16). As described above, k indicates the number of policy iterations, $P_k$ is the solution to a Lyapunov equation in a kth policy iteration, $K_k$ is the linear equilibrium parameter matrix used in the kth policy iteration, and, and $K_{k+1}$ is the linear equilibrium parameter matrix in the (k+1)th policy iteration.

$$\Omega_k = [\Delta_{xx}, -2\Sigma_{xx}(I_n \otimes K_k^T R) - 2\Sigma_{xu}(I_n R)]$$

$$\Xi_k = -\Sigma_{xx} vec(Q_k). \qquad (16)$$

In the above conversion process from equation (13) to equation (15), in order to simplify calculation, let $x^T M x = x \otimes x vec(M)$.

Thus, by updating $K_k$ in equation (16) to $K_{k+1}$ in equation (15), the policy iteration scheme makes generation of the optimal controller no longer dependent on model information (A, B). In addition, equation (16) may also collect the online collected data and update the control policy to $K_{k+1}$ from $K_k$ using equation (15). Thus, the data collected in equation (16) may also be reused to use equation (15) for updating $K_k$ for k=0, 1, ..., 1, and the updating process can be online or offline. Thus, such a policy iteration process may also be referred to as an off-policy iteration.

Furthermore, in order to ensure that a unique pair ($P_k$, $K_{k+1}$) exists to satisfy the requirements of equation (15), a rank condition defined by equation (17) also needs to be satisfied.

$$\text{rank}\left(\left[\sum\nolimits_{xx} \quad \sum\nolimits_{xu}\right]\right) = n(n+3)/2. \qquad (17)$$

Specifically, as is known according to $\lim_{k \to \infty} P_k = P^*$, if the difference between solutions $P_k$ and $P_{k+1}$ of Lyapunov equations corresponding to two adjacent policy iterations is smaller than a preset value (for example, an extremely small value), and thus, the iteration target term converges and policy iterations end.

Figure 7A:
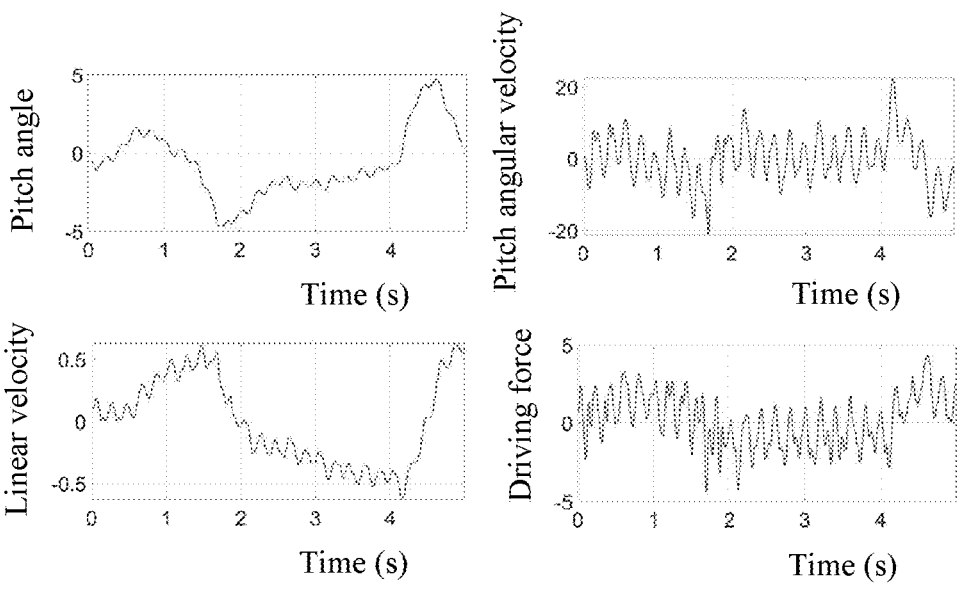
FIG. 7A illustrates motion state data and control data in a motion process of a robot according to an embodiment of the present disclosure.
Figure 7B:
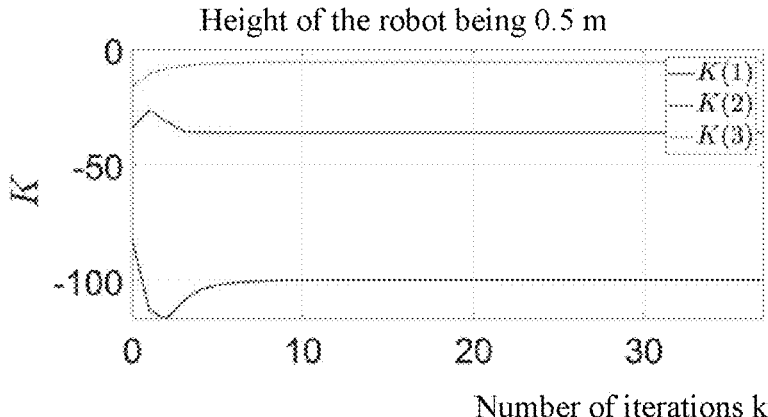
FIG. 7B illustrates a convergence process for a linear equilibrium parameter matrix according to an embodiment of the present disclosure, the base portion heights of the robot being 0.5 m and 0.6 m respectively.
Figures 7C, 8:
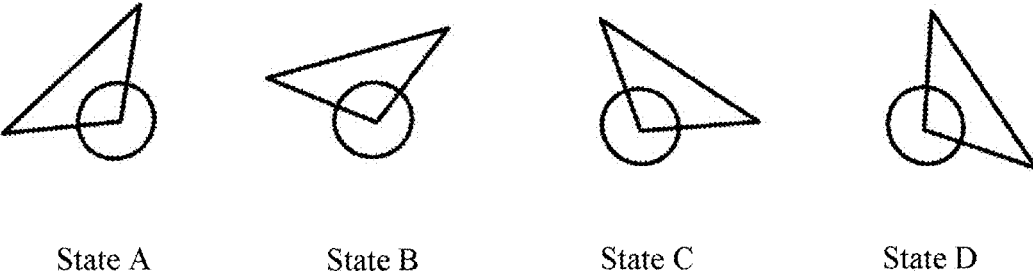
FIG. 7C illustrates motion state data of a robot controlled by the controller respectively to walk straight with the base portion height of 0.6 m according to an embodiment of the present disclosure.
FIG. 8 illustrates a schematic process diagram of collecting motion state data and control data of a robot according to an embodiment of the present disclosure.

Next, a method for controlling the robot illustrated in FIGS. 1 to 4 is further described with reference to FIGS. 6 to 7B. FIG. 6 illustrates another structural view of the robot 100. FIG. 7A illustrates motion state data and control data in a motion process of using the first controller to control the robot. FIG. 7B illustrates a convergence process of a linear equilibrium parameter matrix in a process of building a controller according to the dynamic characteristics of the robot, the base portion heights of the robot being 0.5 m and 0.6 m respectively. FIG. 7C illustrates motion state data of the robot controlled to walk straight with the base portion height of 0.6 m.

The motion process of the robot 100 may be mathematically viewed as a continuous-time linear system. It is assumed that a controller corresponding to the optimal solution to a linear quadratic regulation problem exists for the robot 100, the controller is capable of minimizing the cost functional corresponding to the motion process of the robot. For example, the controller corresponding to the optimal solution to the linear quadratic regulation problem may minimize the cost of the robot being near the equilibrium point and the robot may travel along the target trajectory with minimum energy consumption.

As an example, as described above, equation (7) and equation (8) have been set forth. If the precise dynamic characteristics of the robot 100 are known, then matrices A and B in equation (7) and equation (8) are known. In response to that the matrices A and B in equation (7) and equation (8) are known, u*(t) may be correspondingly solved.

However, as described above, in response to that the precise dynamic characteristics of the robot 100 are unknown, or merely part of the dynamic characteristics of the robot 100 may be determined, the above optimal controller u*(t)=−K*x(t) may not be determined in practical applications. Further, P in equation (7) and equation (8) is not linear, making it difficult to solve an accurate P*.

As described above, according to the related theory of LQR and the related theory of value iterations, with respect to equation (7) and equation (8), if (A, B) is stable and (A, $\sqrt{Q}$) is observable, then for any S≥0, $\lim_{s \to -\infty} P(s) = P^*$, wherein P(s) is a solution to the following differential Riccati equation (equation (18)) but P* is a solution to equation (8).

$$-\frac{dP(s)}{ds} = A^T P(s) + P(s)A - \frac{1}{R}P(s)BB^T P(s) + Q \qquad (18)$$

$$P(t_f) = S$$

That is, as s approaches negative infinity, P(s) will converge to P*.

For example, the step S202 in FIG. 2 may further include: performing integral operation on the motion state data and the control data, corresponding to a plurality of time intervals, respectively, so as to build the iteration relationship function; preforming value iteration on the iteration target item according to the iteration relationship function to approximate to obtain the linear equilibrium parameter matrix corresponding to the dynamic characteristics of the robot. In some embodiments, the linear equilibrium parameter matrix K is $$\frac{1}{R}B^T P(s),$$

where s trends to negative infinity.

Next, step S202 is described respectively by the examples described in FIG. 1 to FIG. 4. According to the description of FIG. 1 to FIG. 4, the motion state data for training and the control data for training may be obtained. In some embodiments, the motion state data for training and the control data for training are the motion data and the control data at the moment that the robot does not fall (for example, the front end/rear end or tail of the base portion do not contact with the ground). That is, at least in this period of motion, the equation (19) is established based on the equation (18).

$$\frac{d}{dt}\left(x(t)^T P(s)x(t)\right) = x(t)^T H(s)x(t) + 2u_0 RK(s)x(t) \qquad (19)$$

where $H(s) = A^T P(s) + P(s)A$ and $K(s) = \frac{1}{R}B^T P(s)$.

Further, the motion state data is collected by a sensor at a certain time interval over a period of time and respectively corresponds to the motion state of the robot at each discrete moment over a period of time. Therefore, the motion state data and the control data of the first controller may correspond to a plurality of time intervals in $[t_0, t_r]$. Any time interval $t_i$ to $t_{i+1}$ in the plurality of time intervals may be marked as [t, t+δt], and the duration δt may be determined according to a data collection time interval that may be achieved by the robot sensor.

Optimally, the integral operation may be respectively performed on the motion state data and the control data, corresponding to a plurality of time intervals, so as to build the iteration relationship function. The motion state data and the control data after the integral operation are used as the training data, which participates in the process that the value iteration is performed on the iteration target item to approximate to obtain the linear equilibrium parameter matrix corresponding to the dynamic characteristics of the robot. Notably, the following description is merely an exemplary integral operation and the present disclosure is not limited thereto.

For example, an equation (20) can be obtained by taking the integral of both sides of equation (19) in a time interval [t, t+δt], for different t for example t=$t_0$, $t_1$, . . . , $t_r$.

$$\tilde{\Omega}\begin{bmatrix} vec(H(s)) \\ vec(K(s)) \end{bmatrix} = \Delta_{xx} vec(P(s)) \qquad (20)$$

where $\tilde{\Omega}=[\Sigma_{xx}, 2\Sigma_{xu}(I_nR)]$. The expressions for $\Delta_{xx}$, $\Sigma_{xx}$ and $\Sigma_{xu}$ has been given in equation (14). Thus, by continually iteratively solving equation (20) and updating equation (18), a linear equilibrium parameter matrix K* may be generated by value iterations, provided that a rank condition is satisfied and there is a unique pair of (H(s), P(s)), and the whole process is no longer dependent on model information (A, B). That is, the value iteration may be stopped when the iteration target item converges in the value iteration process; the linear equilibrium parameter matrix corresponding to the dynamic characteristics of the robot is rebuilt according to the converged iteration target item.

As described above, in an embodiment of the present disclosure, the matrix is built in a manner that the motion state data and the control data of the robot with unknown dynamic characteristics and before losing equilibrium (falling) are collected, and an integral operation is performed on these data, to build the first matrix to the third matrix as the training data. Therefore, in an embodiment of the present disclosure, the quantity of the training data is far less than that required by a reinforcement learning algorithm in related art. The embodiment of the present disclosure also correspondingly builds an iteration relationship function (for example, equation (20)) such that the target iteration terms (for example, P(s), K(s) and H(s)) gradually converge as a learning step increases. Moreover, the converged target iteration term may obtain a controller, the controller converges to a controller corresponding to the optimal solution to the linear quadratic regulation problem, so that the stability of the close-loop system may be guaranteed, and the training process is greatly simplified. The whole process does not require additional limitations on the training data, to simplify the design process of the controller of the robot.

Similarly, as described above, in addition to the wheel legs and the base portion described in FIG. 1 to FIG. 4, the robot 100 further includes the data collection device, the data processing device and the drive motor shown in FIG. 6.

In the example applying the value iteration scheme, the data collection device may be configured to: obtain the motion state data of the robot.

A data processing device is configured to: obtain the control data corresponding to the motion state data; calculate the linear equilibrium parameter matrix by using the value iteration manner based on the motion state data and the control data, where diversity measures of the motion state data and the control data are higher than a predetermined threshold; and build the controller corresponding to dynamic characteristics of the robot based on the linear equilibrium parameter matrix.

For example, the data processing device may be further configured to further process the data collected by the data collection device. For easy description, the present disclosure only gives the example of controlling the driving wheel 104, and those skilled in the art should understand that the scheme of the present disclosure may also be used for controlling other components of the robot. Then, the data processing device sets the control data for training based on the given target trajectory. With reference to FIG. 3, the present disclosure is not limited to the specific control laws of the controller used for training. In order to explain the non-limitation of the present disclosure on the controller used for training, an experimenter later manually controls the motion of the robot to extract motion state data and control data as an example for explanation. Further, a control frequency of the data processing device is 1,000 Hz.

As described above, the motion data and the control data will be used to calculate $\Delta_{xx}$, $\Sigma_{xx}$ and $\Sigma_{xu}$. These data require the continuous signals of x and u. The motion data is collected by adopting a manner similar to FIG. 7A, for example, with the height l=0.33 m of the base portion of the robot 100, an instruction is inputted manually by using the remote controller, to determine the data of motion of the robot controlled by the remote controller. Specifically, since the experimenter cannot accurately know the dynamic characteristics of the robot 100, the controller of the robot cannot be accurately regulated in time when the robot is manually controlled, resulting in the robot falling.

Specifically, the collected motion state data may be further processed so as to obtain the controller corresponding to the dynamic characteristics of the robot as quickly as possible. For example, in an experiment, the motion state data during the motion process may be collected by using the at least one motion data collector or the motion data collection thread; the repeated motion state data is removed based on the collection time of the motion state data. Specifically, the frequencies of the different motion data collectors/threads (imu frequency, control frequency, storage data frequency) will exist in the situation of storing the same data. Therefore, when the data is processed offline in combination with the value iteration scheme, it is necessary to judge whether there is the same data based on the time, and the repeated data is eliminated. Therefore, the error of the host computer on the robot in the multi-thread collection data may be further amended.

In an example, since the control thread is not completed accurately in 0.001 s every time, and there may be duplicate times in the data. For example, if controlling thread latency results in a data collection time of 3*0.001 s, the thread used to store the data will simultaneously store three sets of identical data (duplicate data). Therefore, the duplicate data is eliminated during the data processing. Based on this, if the differential calculation velocity is needed, the real time difference (the system time of the industrial personal computer makes a time difference), instead of controlling the period ideally (0.001 s). Further, for the specific motion state data/control data, for example, the angular velocity, linear velocity and torque of the robot, the further filtering treatment is needed to reduce the error during the data collection process.

In another example, due to a case of collecting the data for multiple times, the motion state data of the tilt angle of the base portion of the robot in a predetermined range may be obtained during the motion process of the robot. For example, in such cases, the data of the linear part (with a tilt angle within +−15 degrees) can only be concatenated and used after multiple data collections. For example, after completing the integral of $\Delta_x$, $\Sigma_{xx}$ and $\Sigma_{xu}$, the motion state data and the control data of the tilt angle within +−15 degrees may be concatenated again. The example experiment for calculating the controller corresponding to the dynamic characteristics of the robot by the value iteration scheme is shown below. As shown in FIG. 8, a minimum height of the robot is 0.33 m. Moreover, the motion instruction is manually and directly given by the remote controller, to indicate the torque of the driving wheel. In this experiment, with the increased torque of the driving wheel, the robot moves (shown in state B and state C) by using the driving wheel from the initial state (shown in state A), and finally falls (state D). Finally, the robot loses equilibrium, and the remote controller is not the equilibrium-like controller in this case.

Figure 9:
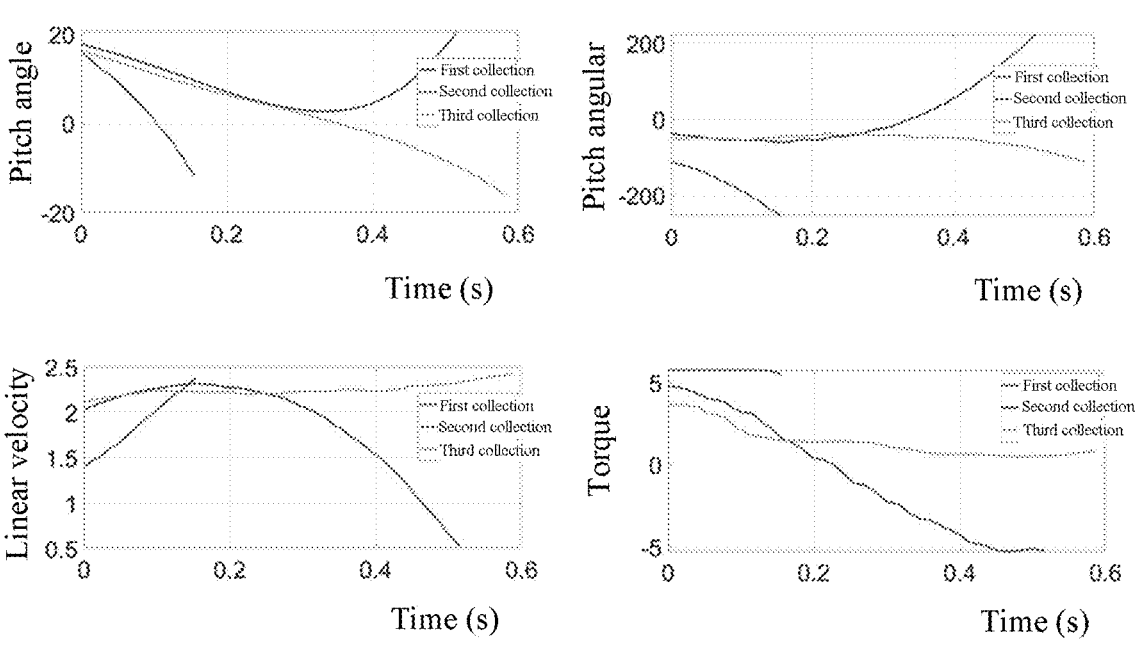
FIG. 9 illustrates a plot of collecting motion state data and control data of a robot according to an embodiment of the present disclosure.

The similar process is repeated three times, and the data collected in three times is drawn in FIG. 9, where the torque is the total torque of the two driving wheel motors. Specifically, when the system is assumed to be linear, the data in the linear area approaching the simplified model is used, that is, −20 degrees<tilt angle<20 degrees. As shown in FIG. 9, the process duration for collecting the data for three times is respectively 0.515 s, 0.155 s and 0.586 s, and a total of 1.256 s. Any non-professional person may collect these short-time data easily in a manner that the torque is manually input by the remote controller. In addition, the value iteration scheme may be carried out offline, so as to easily regulate various parameters and converge the iteration term.

Figure 10:
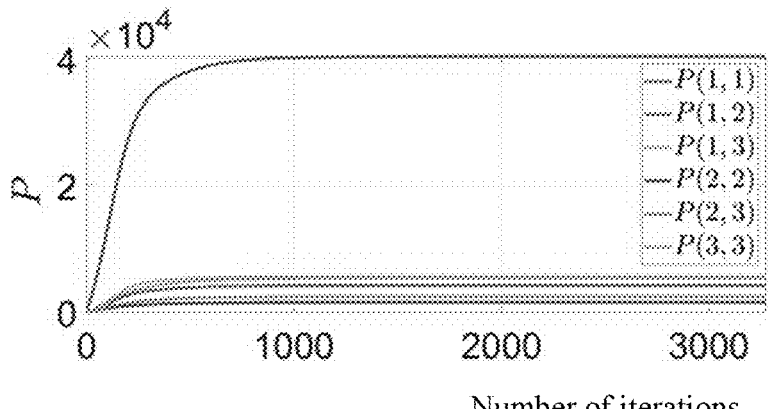
FIG. 10 illustrates a schematic iteration diagram of collecting a linear equilibrium parameter matrix in a process of a robot according to an embodiment of the present disclosure.

For the motion state data and the control data in FIG. 9, Q=diag[20000,8000,3000], R=20 and $t_{i+1}-t_i=0.1$ s are set, and the iteration schematic diagrams of P and K shown in FIG. 10 may be obtained. According to the testing of the experimenter, the converged K=[−81.99, −34.96, −16.38] may be obtained after 3275th value iteration.

Based on K=[−81.99, −34.96, −16.38], the controller corresponding to dynamic characteristics of the robot is built. The controller is used to control a real robot to travel in the path illustrated in FIG. 11, and the test data of a tilt angle (which is approximately within plus or minus 2 deg), a linear velocity, and a yaw velocity illustrated in FIG. 12 are collected. It may be seen that a controller with strong enough robustness and stability may be obtained by using the iteration scheme.

It is to be understood by a person skilled in the art that the controller may also be used to control other motions, and the present disclosure is not limited thereto. Furthermore, it has been tested that the robustness of the controller is much higher than that of the PID controller, that is, when the robot 100 is externally disturbed, the robot under control of the controller may quickly recover its equilibrium.

Thus, the embodiment of the present disclosure solves the problem of optimal equilibrium control of a robot without knowledge of the dynamic characteristics of the robot using a value iteration scheme based on reinforcement learning and ADP technologies in artificial intelligence. The process of building the controller of the embodiment of the present disclosure merely requires that the wheel-legged robot travels for a period of time or a section of trajectory under the control of a non-optimal controller or an arbitrary controller, and collects motion state data and control data corresponding to the period of time or the section of trajectory as training data. Thus, the amount of training data of the embodiment of the present disclosure is much smaller than the amount of data required by a reinforcement learning algorithm in related art. Further, According to the embodiment of the present disclosure, the trained controller gradually converges to a controller corresponding to the optimal solution to the linear quadratic regulation problem as the learning step increases, so that stability of a close-loop system can be ensured, the training process is greatly simplified, and additional limitations on training data are not required, so as to simplify the design process of a controller for a wheel-legged robot.

Figure 13:
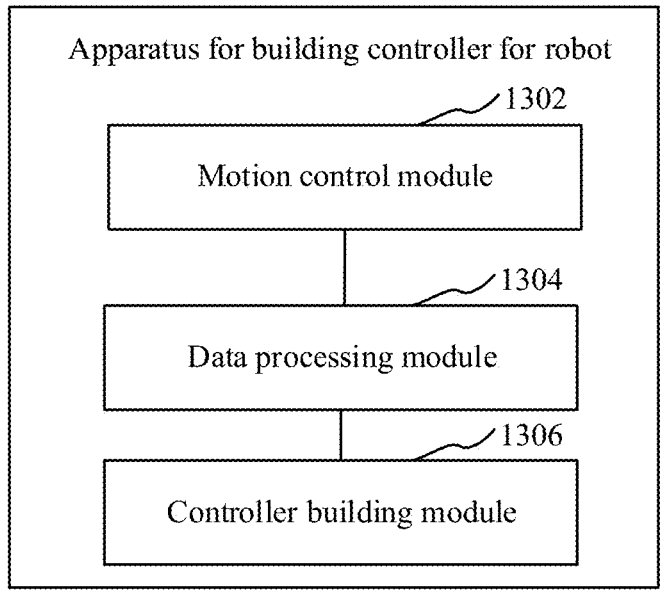
FIG. 13 illustrates a structural block diagram of a device for building a controller for a robot according to an embodiment of the present disclosure.

As shown in FIG. 13, the present disclosure provides a device for building a controller for a robot, the device including:

a motion control module 1302 configured to control motion of the robot, and obtain motion state data and control data of the robot during a motion process, and diversity measures of the motion state data and the control data are higher than a predetermined threshold;

a data processing module 1304 configured to calculate a linear equilibrium parameter matrix by using a value iteration manner according to the motion state data and the control data; and a controller building module 1306 configured to build a controller corresponding to dynamic characteristics of the robot based on the linear equilibrium parameter matrix.

In some embodiments, the motion control module is configured to:

adaptively determine the control information for controlling rotation of the driving wheels based on the historical motion information of the robot; determine first control information for controlling multiple joints of the robot based on the control information for controlling the rotation of the driving wheels, the first control information causing the robot to maintain equilibrium; determine second control information for controlling the multiple joints based on the target trajectory of the robot, the second control information causing the robot to move along the target trajectory; determine the control torque of each joint in the wheel legs of the robot based on the motion constraint conditions of the robot, the first control information, and the second control information; and drive each joint based on the control torque, so as to control the motion of the robot.

In some embodiments, the is driven by at least one driving wheel in the wheel legs of the robot to move;

the controlling motion of the robot and obtaining the motion state data and the control data during the motion process comprises any one or more of the following items:

controlling the drive motor to output a first torque, so that the robot loses equilibrium due to low velocity motion;

controlling the drive motor to output second first torque, so that the robot loses equilibrium due to high velocity motion;

controlling the drive motor to output a third torque, so that the robot maintains the equilibrium state for a period of time; and controlling the drive motor to output a fourth torque, so that the robot maintains the equilibrium-like state for a period of time, and the robot in the equilibrium-like state is near an equilibrium point during the motion process.

In some embodiments, the center of mass of the base portion of the robot is first raised and then lowered in response to that the drive motor is controlled to output the first torque, and a front end of the base portion is in contact with the ground when the robot loses the equilibrium;

the center of mass of the base portion of the robot is first raised and then lowered in response to that the drive motor is controlled to output the second torque, and a rear end of the base portion is in contact with the ground when the robot loses the equilibrium;

the center of mass of the base portion of the robot remains unchanged in height in response to that the drive motor is controlled to output the third torque and the robot maintains the equilibrium state; and the base portion of the robot shakes back and forth in response to that the drive motor is controlled to output the fourth torque and the robot maintains the equilibrium-like state.

In some embodiments, the controller corresponding to dynamic characteristics of the robot is a linear controller; and for each moment during the motion process, the control torque provided by the linear controller is negatively correlated to a product of the linear equilibrium parameter matrix and the motion state data of the robot.

In some embodiments, the motion control module is also configured to control motion of the robot by using a remote controller, and obtain the motion state data and the control data during the motion process; wherein the robot under control of the controller corresponding to the dynamic characteristics of the robot has a better control effect during the motion process compared to the robot under control of the remote controller.

In some embodiments, the motion control module is further configured to determine the control data of the remote controller based on instructions input by a remote controller; control motion of the robot according to the control data of the remote controller; and obtain the motion state data of the robot during the motion process.

In some embodiments, the motion state data and the control data correspond to a plurality of time intervals, and the data processing module is further configured to determine an iteration target item, and respectively perform integral operation on the motion state data and the control data according to a time interval, so as to build an iteration relationship function; and the value iteration is performed on the iteration target item according to the iteration relationship function to approximate to obtain the linear equilibrium parameter matrix corresponding to the dynamic characteristics of the robot.

In some embodiments, the data processing module is further configured to stop value iteration when the iteration target item converges in the value iteration process; and rebuild the linear equilibrium parameter matrix corresponding to the dynamic characteristics of the robot according to the converged iteration target item.

In some embodiments, the motion control module is further configured to collect the motion state data during the motion process by using at least one motion data collector or at least one motion data collection thread; remove the repeated motion state data based on the collection time of the motion state data.

In some embodiments, the motion control module is further configured to obtain the motion state data of the tilt angle of the base portion of the robot in a predetermined range during the motion process of the robot.

Figure 14:
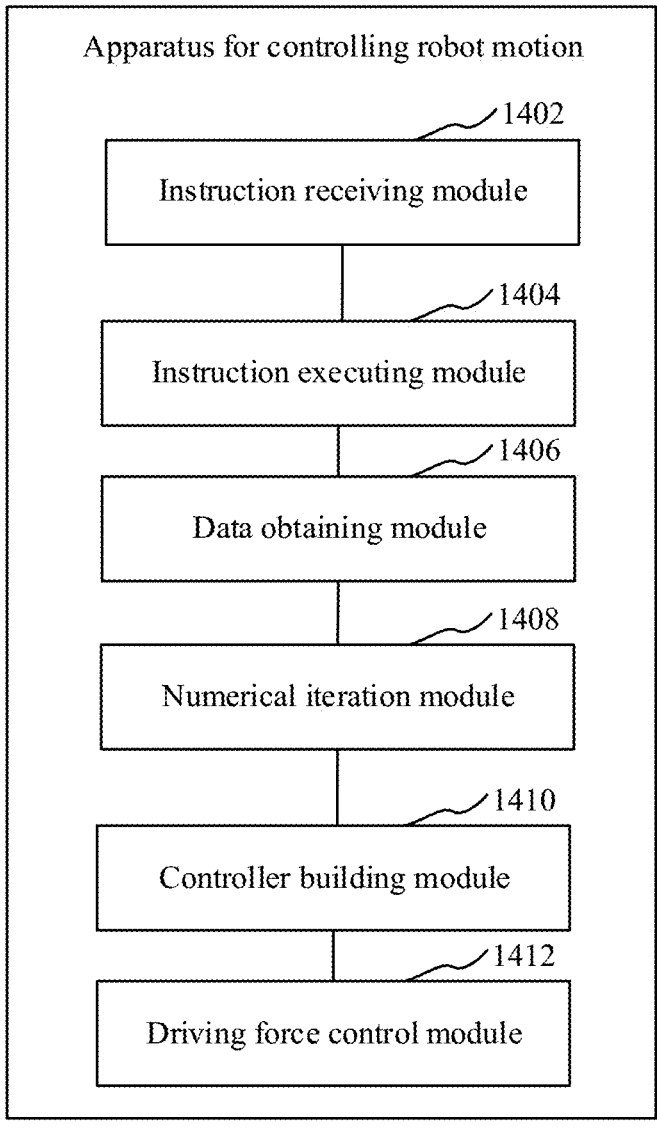
FIG. 14 illustrates a structural block diagram of a device for controlling motion of the robot according to an embodiment of the present disclosure.

As shown in FIG. 14, the present disclosure provides a device for controlling motion of the robot, the robot is driven by at least one driving wheel to move, and the device includes:

an instruction receiving module 1402 configured to receive a motion instruction indicating a motion trajectory of the robot;

an instruction executing module 1404 configured to apply a driving force to the driving wheel according to the motion instruction, so that the robot moves according to the motion trajectory;

a data obtaining module 1406 configured to obtain motion state data and control data of the robot during a motion process, and diversity measures of the motion state data and the control data are higher than a predetermined threshold;

a value iteration module 1408 configured to calculate a linear equilibrium parameter matrix by using a value iteration manner based on the motion state data and the control data; and a controller building module 1410 configured to build a controller corresponding to dynamic characteristics of the robot based on the linear equilibrium parameter matrix;

a driving force control module 1412 configured to control the driving force applied to the driving wheel by using the controller.

The present disclosure provides a computer-readable storage medium, storing computer-readable instructions, and the computer-readable instructions, when executed by one or more processors, perform the method of any above embodiment.

The present disclosure provides a computer program product comprising computer-readable instructions, and the computer-readable instructions, when executed by one or more processors, perform the method of any above embodiment.

The robot may also include, for example, a bus, a memory, a sensor component, a communication module, and an input-output device, according to actual needs. The embodiment of the present disclosure is not limited by the specific components of the robot.

The bus may be a circuit that interconnects the components of the robot and communicates communication information (for example, control messages or data) among components.

The sensor component may be used for perceiving the physical world, including, for example, a camera, an infrared sensor, an ultrasonic sensor and the like. In addition, the sensor component may also include a device for measuring the current operation and motion state of the robot, such as a Hall sensor, a laser position sensor, or a strain gauge force sensor.

The communication module may, for example, be connected to a network through a wired or wireless connection to facilitate communication with the physical world (for example, a server). The communication module may be wireless and may include a wireless interface, such as an IEEE 802.11, Bluetooth, a wireless local area network ("WLAN") transceiver, or a radio interface for accessing a cellular telephone network (for example, a transceiver/antenna for accessing a CDMA, a GSM, a UMTS, or other mobile communication networks). In another example, the communication module may be wired and may include an interface such as Ethernet, USB, or IEEE 1394.

The input-output device may transmit, for example, a command or data inputted from the user or any other external device to one or more other components of the robot, or may output a command or data received from one or more other components of the robot to the user or other external device.

Multiple robots may constitute a robot system to cooperatively complete a task, the multiple robots being communicatively connected to a server and receiving a cooperative robot instruction from the server.

The program part of the above technology may be considered as "product" or "article of manufacture" present in the form of an executable code and/or related data, embodied or implemented by a computer-readable medium. A tangible and permanent storage medium may include any memory or storage for a computer, a processor, or a similar device or a related module, for example, a semiconductor memory, a tape drive, a disk drive, or any device capable of providing a storage function for software.

All or part of the software may sometimes communicate over a network, such as the Internet or other communication networks. Such communication may load software from one computer device or a processor to another. Therefore, another medium capable of transmitting software elements can also be used as a physical connection between local devices, for example, light waves, electric waves, and electromagnetic waves are transmitted through cables, optical cables, or the air. A physical medium over which a carrier wave travels, such as a cable, a wireless link, an optical cable, or a similar device, may also be thought of as the medium on which the software is carried. As used herein, in addition to a tangible "storage" medium being limited, other terms representing a computer- or machine-readable "medium" refer to media that participate during execution of any instructions by a processor.

The present disclosure uses certain words to describe the embodiment of the present disclosure. For example, "a first/second embodiment," "an embodiment," and/or "some embodiments" refer to a certain feature, structure, or characteristic relate to at least one embodiment of the present disclosure. Therefore, it is to be emphasized and noted that "an embodiment" or "one embodiment" or "an alternative embodiment" referred to two or more times in different places in the description are not necessarily referring to the same embodiment. Furthermore, certain features, structures, or characteristics in one or more embodiments of the present disclosure may be combined as appropriate.

Furthermore, a person skilled in the art may understand various aspects of the present disclosure may be explained and described with respect to a plurality of patentable classes or situations, including any new and useful combination of processes, machines, products, or materials, or any new and useful improvements thereof. Correspondingly, various aspects of the present disclosure may be entirely executed by hardware, may be entirely executed by software (including firmware, resident software, microcodes, and the like), or may be executed by a combination of hardware and software. The foregoing hardware or software may be referred to as "data block", "module", "engine", "unit", "component" or "system". In addition, various aspects of the present disclosure may be embodied as computer products located in one or more computer-readable media, the product including a computer-readable program code.

Unless otherwise defined, all terms (including technical and scientific terms) used herein have the same meaning as commonly understood by one of ordinary skill in the art to which the present disclosure belongs. It is further to be understood that, the terms such as those defined in commonly used dictionaries are to be interpreted as having meanings that are consistent with the their meanings in the context of the related art, and are not to be interpreted in an idealized or extremely formalized sense, unless so expressively defined herein.

The above is description of the present disclosure, and is not to be considered as a limitation to the present disclosure.

Although several exemplary embodiments of the present disclosure are described, a person skilled in the art may easily understand that, many modifications can be made to the exemplary embodiments without departing from novel teachings and advantages of the present disclosure. Therefore, all these modifications are intended to be included within the scope of the present disclosure as defined by the claims. It is to be understood that, the above is description of the present disclosure, and is not to be considered to be limited by the disclosed specific embodiments, and modifications to the disclosed embodiments and other embodiments fall within the scope of the appended claims. The present disclosure is defined by the claims and equivalents thereof.

What is claimed is:

1. A method for configuring a controller for a wheel-legged robot, executed by a processor, the robot comprising a base portion and one or more wheel legs connected to the base portion, the method comprising:

controlling motion of the robot, comprising at least one of:
controlling a drive motor to output a first torque, causing a center of mass of a base portion to be first raised and then lowered, and causing the robot to lose equilibrium with a front end of the base portion contacting a ground; or
controlling the drive motor to output a second torque, causing the center of mass of the base portion to be first raised and then lowered, and causing the robot to lose the equilibrium with a rear end of the base portion contacting the ground;
obtaining motion state data and control data of the robot during a motion process, wherein diversity measures of the motion state data and the control data are higher than a predetermined threshold;
calculating a linear equilibrium parameter matrix by using a value iteration manner according to the motion state data and the control data; and
configuring the controller corresponding to dynamic characteristics of the robot based on the linear equilibrium parameter matrix.

2. The method according to claim 1, wherein the controlling motion of the robot comprises:

adaptively determining control information for controlling rotation of a driving wheel based on historical motion information of the robot;
determining first control information for controlling multiple joints of the robot based on the control information for controlling the rotation of the driving wheel, the first control information causing the robot to maintain equilibrium;
determining second control information for controlling the multiple joints based on a target trajectory of the robot, the second control information causing the robot to move along the target trajectory;
determining control torques of the multiple joints in one or more wheel legs of the robot based on a motion constraint condition of the robot, the first control information, and the second control information; and
driving the multiple joints based on the control torques, so as to control the motion of the robot.

3. The method according to claim 1, wherein the robot is driven by one or more driving wheels in one or more wheel legs of the robot to move;

the controlling motion of the robot and obtaining the motion state data and the control data during the motion process comprises at least one of:

controlling the drive motor to output a third torque, so that the robot maintains an equilibrium state for a period of time; or
controlling the drive motor to output a fourth torque, so that the robot maintains an equilibrium-like state for a period of time during the motion process.

4. The method according to claim 3, wherein the center of mass of the base portion of the robot remains unchanged in height in response to that the drive motor is controlled to output the third torque and the robot maintains the equilibrium state; and
the base portion of the robot shakes back and forth in response to that the drive motor is controlled to output the fourth torque and the robot maintains the equilibrium-like state.

5. The method according to claim 1, wherein the controller corresponding to dynamic characteristics of the robot is a linear controller; and for a moment during the motion process, a control torque provided by the linear controller is negatively correlated to a product of the linear equilibrium parameter matrix and the motion state data of the robot.

6. The method according to claim 1, wherein the controlling motion of the robot and obtaining the motion state data and the control data of the robot during the motion process comprises:

controlling motion of the robot by using a remote controller, and obtaining the motion state data and the control data during the motion process.

7. The method according to claim 6, wherein the obtaining the motion state data and the control data during the motion process comprises:

determining the control data of the remote controller based on instructions input by the remote controller; and
controlling motion of the robot according to the control data of the remote controller; and
obtaining the motion state data of the robot during the motion process.

8. The method according to claim 1, wherein the motion state data and the control data correspond to a plurality of time intervals, and calculating the linear equilibrium parameter matrix by using the value iteration manner comprises:

determining an iteration target item, and respectively performing operation on the motion state data and the control data according to a time interval, to establish an iteration relationship function; and
performing value iteration on the iteration target item according to the iteration relationship function to obtain the linear equilibrium parameter matrix corresponding to the dynamic characteristics of the robot.

9. The method according to claim 8, wherein the performing value iteration on the iteration target item according to the iteration relationship function to obtain the linear equilibrium parameter matrix corresponding to the dynamic characteristics of the robot comprises:

stopping value iteration when the iteration target item converges in a value iteration process; and
rebuilding the linear equilibrium parameter matrix corresponding to the dynamic characteristics of the robot according to the converged iteration target item.

10. The method according to claim 1, wherein the obtaining the motion state data of the robot during the motion process comprises:

collecting the motion state data during the motion process by using at least one motion data collector or at least one motion data collection thread; and removing repeated motion state data based on collection times of the motion state data.

11. The method according to claim 1, wherein the obtaining the motion state data of the robot during the motion process comprises:

obtaining the motion state data of a tilt angle of a base portion of the robot in a predetermined range during the motion process of the robot.

12. A robot, comprising:

a base portion;

one or more wheel legs connected to the base portion;

at least one drive motor configured to drive the one or more wheel legs, the at least one drive motor being controlled by a controller to perform at least one of:

outputting a first torque, causing a center of mass of a base portion to be first raised and then lowered, and causing the robot to lose equilibrium with a front end of the base portion contacting a ground; or outputting a second torque, causing the center of mass of the base portion to be first raised and then lowered, and causing the robot to lose the equilibrium with a rear end of the base portion contacting the ground;

a data collection device configured to: obtain motion state data of the robot; and a data processing device configured to:

obtain control data corresponding to the motion state data; and calculate a linear equilibrium parameter matrix by using a value iteration manner based on the motion state data and the control data, wherein diversity measures of the motion state data and the control data are higher than a predetermined threshold; and configure the controller corresponding to dynamic characteristics of the robot based on the linear equilibrium parameter matrix.

13. A non-transitory computer readable storage medium, storing computer readable instructions, the computer readable instructions when executed by one or more processors, causing the one or more processors to perform:

controlling motion of a robot, the robot comprising a base portion and one or more wheel legs connected to the base portion;

controlling motion of the robot, comprising at least one of:

controlling a drive motor to output a first torque, causing a center of mass of a base portion to be first raised and then lowered, and causing the robot to lose equilibrium with a front end of the base portion contacting a ground; or controlling the drive motor to output a second torque, causing the center of mass of the base portion to be first raised and then lowered, and causing the robot to lose the equilibrium with a rear end of the base portion contacting the ground;

obtaining motion state data and control data of the robot during a motion process, wherein diversity measures of the motion state data and the control data are higher than a predetermined threshold;

calculating a linear equilibrium parameter matrix by using a value iteration manner according to the motion state data and the control data; and configuring a controller corresponding to dynamic characteristics of the robot based on the linear equilibrium parameter matrix.

14. The non-transitory computer readable storage medium according to claim 13, wherein the controlling motion of the robot comprises:

adaptively determining control information for controlling rotation of a driving wheel based on historical motion information of the robot;

determining first control information for controlling multiple joints of the robot based on the control information for controlling the rotation of the driving wheel, the first control information causing the robot to maintain equilibrium;

determining second control information for controlling the multiple joints based on a target trajectory of the robot, the second control information causing the robot to move along the target trajectory;

determining control torques of the multiple joints in one or more wheel legs of the robot based on a motion constraint condition of the robot, the first control information, and the second control information; and driving the multiple joints based on the control torques, so as to control the motion of the robot.

15. The non-transitory computer readable storage medium according to claim 13, wherein the robot is driven by one or more driving wheels in one or more wheel legs of the robot to move;

the controlling motion of the robot and obtaining the motion state data and the control data during the motion process comprises at least one of:

controlling the drive motor to output a third torque, so that the robot maintains an equilibrium state for a period of time; or controlling the drive motor to output a fourth torque, so that the robot maintains an equilibrium-like state for a period of time during the motion process.

16. The non-transitory computer readable storage medium according to claim 15, wherein the center of mass of the base portion of the robot remains unchanged in height in response to that the drive motor is controlled to output the third torque and the robot maintains the equilibrium state; and the base portion of the robot shakes back and forth in response to that the drive motor is controlled to output the fourth torque and the robot maintains the equilibrium-like state.

17. The non-transitory computer readable storage medium according to claim 13, wherein the controller corresponding to dynamic characteristics of the robot is a linear controller; and for a moment during the motion process, a control torque provided by the linear controller is negatively correlated to a product of the linear equilibrium parameter matrix and the motion state data of the robot.

18. The non-transitory computer readable storage medium according to claim 13, wherein the motion state data and the control data correspond to a plurality of time intervals, and calculating the linear equilibrium parameter matrix by using the value iteration manner comprises:

determining an iteration target item, and respectively performing operation on the motion state data and the control data according to a time interval, to establish an iteration relationship function; and performing value iteration on the iteration target item according to the iteration relationship function to obtain the linear equilibrium parameter matrix corresponding to the dynamic characteristics of the robot.

19. The non-transitory computer readable storage medium according to claim 18, wherein the performing value iteration on the iteration target item according to the iteration relationship function to obtain the linear equilibrium parameter matrix corresponding to the dynamic characteristics of the robot comprises:

stopping value iteration when the iteration target item converges in a value iteration process; and rebuilding the linear equilibrium parameter matrix corresponding to the dynamic characteristics of the robot according to the converged iteration target item.

\* \* \* \* \*